US008247052B2

(12) United States Patent
Loyens et al.

(10) Patent No.: US 8,247,052 B2
(45) **Date of Patent: *Aug. 21, 2012**

(54) COAXIAL CABLE

(75) Inventors: Wendy Loyens, Stenungsund (SE); Manfred Stadlbauer, Linz (AT); Hans Eklind, Stenungsund (SE)

(73) Assignee: Borealis Technology Oy (FI)

( * ) Notice: Subject to any disclaimer, the term of this patent is extended or adjusted under 35 U.S.C. 154(b) by 650 days.

This patent is subject to a terminal disclaimer.

(21) Appl. No.: 12/408,248

(22) Filed: Mar. 20, 2009

(65) Prior Publication Data

US 2009/0183894 A1 Jul. 23, 2009

Related U.S. Application Data

(63) Continuation of application No. PCT/EP2007/008278, filed on Sep. 24, 2007.

(30) Foreign Application Priority Data

Sep. 25, 2006 (EP) .................................... 06020007

(51) Int. Cl.
*B29C 47/00* (2006.01)
*B29D 22/00* (2006.01)

(52) U.S. Cl. ....................... 428/36.9; 428/35.7; 428/35.8

(58) Field of Classification Search ................. 428/36.9, 428/35.7, 35.8
See application file for complete search history.

(56) References Cited

U.S. PATENT DOCUMENTS 4,404,342 A 9/1983 Miyoshi et al.
4,483,971 A 11/1984 Sato et al.
4,634,745 A 1/1987 Ehrig et al.
4,701,432 A 10/1987 Welborn, Jr.
4,808,561 A 2/1989 Welborn, Jr.
5,250,631 A 10/1993 McCullough, Jr.
5,302,744 A * 4/1994 Wang et al. .................... 560/75

(Continued)

FOREIGN PATENT DOCUMENTS

DE 203 915 11/1983

(Continued)

OTHER PUBLICATIONS

Chujo, R. Heptad configurational analysis of 13C N.M.R. spectra in highly isotactic polypropylene, *Polymer 29*, vol. 29, Jan. pp. 138-143 (1988).

(Continued)

*Primary Examiner* — Rena Dye
*Assistant Examiner* — James Yager
(74) *Attorney, Agent, or Firm* — McAndrews, Held & Malloy, Ltd.

(57) ABSTRACT

Certain embodiments of the present technology provide a cable comprising a conductor and a cable layer. The cable layer comprises a polypropylene material. The cable layer and/or the polypropylene material comprise a crystalline fraction crystallizing in the temperature range of 200 to 105° C. determined by stepwise isothermal segregation technique. The crystalline fraction comprises a part, wherein, during subsequent melting at a melting rate of 10° C./min, the part melts at or below 130° C. and the part represents at least 20 percent by weight of the crystalline fraction. In certain embodiments, the part melts at or below the temperature T=Tm−3° C., wherein Tm is the melting temperature of the cable layer and/or the polypropylene material, and the part represents at least 45 percent by weight of the crystalline fraction. Certain embodiments provide methods and processes for manufacturing the cable described above and herein.

36 Claims, 8 Drawing Sheets

U.S. PATENT DOCUMENTS

| | | | | |
|---|---|---|---|---|
| 5,326,625 | A | 7/1994 | Schuhmann et al. | |
| 5,948,547 | A | 9/1999 | Mikielski et al. | |
| 6,086,982 | A | 7/2000 | Peiffer et al. | |
| 6,096,843 | A * | 8/2000 | Saito et al. | 526/127 |
| 6,225,432 | B1 | 5/2001 | Weng et al. | |
| 6,479,422 | B1 * | 11/2002 | Eilerts | 502/117 |
| 6,805,930 | B2 | 10/2004 | Hanada et al. | |
| 2002/0173602 | A1 | 11/2002 | Appleyard | |
| 2002/0198318 | A1 | 12/2002 | Obata | |
| 2003/0149199 | A1 * | 8/2003 | Schottek et al. | 526/126 |
| 2004/0010087 | A1 | 1/2004 | Obata et al. | |
| 2004/0072005 | A1 | 4/2004 | German | |
| 2005/0090571 | A1 | 4/2005 | Mehta | |

FOREIGN PATENT DOCUMENTS

| | | |
|---|---|---|
| DE | 3 539 352 | 5/1986 |
| DE | 198 27 327 | 12/1999 |
| DE | 199 49 235 | 5/2000 |
| EP | 0 36 457 | 9/1981 |
| EP | 0 190 889 | 8/1986 |
| EP | 0 384 431 | 8/1990 |
| EP | 0 887 379 | 12/1990 |
| EP | 0 674 325 | 9/1995 |
| EP | 0 674 991 | 10/1995 |
| EP | 0 690 458 | 1/1996 |
| EP | 0 747 212 | 11/1996 |
| EP | 0 745 637 | 12/1996 |
| EP | 0 873 862 | 10/1998 |
| EP | 0 879 830 | 11/1998 |
| EP | 0 885 918 | 12/1998 |
| EP | 0 893 802 | 1/1999 |
| EP | 0 919 572 | 6/1999 |
| EP | 0 942 013 | 9/1999 |
| EP | 1 295 910 | 3/2003 |
| EP | 1 302 310 | 4/2003 |
| EP | 1 367 068 | 12/2003 |
| EP | 1 408 077 | 4/2004 |
| EP | 1 429 346 | 6/2004 |
| EP | 1 484 345 | 12/2004 |
| EP | 1 495 861 | 1/2005 |
| EP | 1 634 699 | 3/2006 |
| EP | 1 724 289 | 11/2006 |
| EP | 1 726 602 | 11/2006 |
| EP | 1 726 603 | 11/2006 |
| EP | 1 847 551 | 10/2007 |
| EP | 1 847 552 | 10/2007 |
| EP | 1 847 555 | 10/2007 |
| JP | 2001/0188431 | 6/1999 |
| JP | 2001/354 814 | 7/2000 |
| JP | 2003 147110 | 11/2001 |
| JP | 2002 363356 | 12/2002 |
| JP | 2006/022 276 | 6/2004 |
| WO | WO 94/28034 | 12/1994 |
| WO | WO 95/30708 | 11/1995 |
| WO | WO 97/22633 | 6/1997 |
| WO | WO 92/12182 | 7/1997 |
| WO | WO 98/10016 | 3/1998 |
| WO | WO 98/58971 | 12/1998 |
| WO | WO 99/09096 | 2/1999 |
| WO | WO 99/24478 | 5/1999 |
| WO | WO 99/29742 | 6/1999 |
| WO | WO 00/012572 | 3/2000 |
| WO | WO 00/12572 | 3/2000 |
| WO | WO 00/68315 | 11/2000 |
| WO | WO 00/73369 | 12/2000 |
| WO | WO 00/78858 | 12/2000 |
| WO | WO 01/25296 | 4/2001 |
| WO | WO 01/48034 | 7/2001 |
| WO | WO 01/98409 | 12/2001 |
| WO | WO 02/16455 | 2/2002 |
| WO | WO 02/44251 | 6/2002 |
| WO | WO 02/090400 | 11/2002 |
| WO | WO03/000754 | 1/2003 |
| WO | WO 03/040233 | 5/2003 |
| WO | WO 03/051934 | 6/2003 |
| WO | WO 2004/013193 | 2/2004 |
| WO | WO2004/026921 | 4/2004 |
| WO | WO 2004/037871 | 5/2004 |
| WO | WO2004/046208 | 6/2004 |
| WO | WO2004/052950 | 6/2004 |
| WO | WO2004101673 | 11/2004 |
| WO | WO 2005/044877 | 5/2005 |
| WO | WO 2006/118890 | 11/2006 |
| WO | WO 2008/022803 | 2/2008 |

OTHER PUBLICATIONS

Chujo R. Two-site model analysis of 13C n.m.r, of polypropylene polymerized by Ziegler-Natta catalyst with external alkoxysilane donors, *Polymer*, vol. 35, part II, pp. 339-342 (1994).

Sentmanat, Rheol, *Measuring the Transient Extension Rheology of Polythylene Melts Using the SER Universal Testing Platform*, J. Rheology, May/June Issue, pp. 1-20 (2005).

Zimm, B.H. and Stockmayer, Walter The Dimension of Chain Molecules Containing Branches and Rings, *The Journal of Chemical Physics*, vol. 17, No. 12, pp. 1301-1314 (1949).

Hayashi, et al., 13C N.M.R. spectral assignments and hexad comonomer sequence determination in stereoregular ethylene-propylene copolymer, *Polymer*, vol. 29, pp. 1848-1847 (1988).

Polypropylene Process Review, Does Borstar shine? *ECN Chemscope*, May 1999, pp. 17-18, 20-21.

Pinter, Gerald et al., *Accelerated quality assurance tests for PE pipe grades*, 64$^{th}$ Annual Technical Conference, pp. 2080-2084, Society of Plastics Engineers, (2006).

Cazenave, J., et al., Short-term mechanical and structural approaches for the evaluation of polyethylene stress crack resistance Groupe d'Etude de Metallurgie Physique et de Physique des Materiaux, *Polymer 47*, pp. 3904-3914 (2006).

Nezbedova, E et al., Influence of processing conditions on the structural and fracture behavior of PP pipe grades, *Journal of Macromolecular Science*, Part B Physics, B41 Nos. 4-6, pp. 711-723, (2002).

Nezbedova, E. et al., Brittle failure versus structure of HDPE pipe resins, *Journal of Macromolecular Science*, Part B Physics, B40 3&4, pp. 507-515, (2001).

Nezbedoca, E, et al., Relation of slow crack growth failure time to structure of HDPE, *Mechanics of Time-Dependent Materials 5*, pp. 67-78, (2001).

Nezbedova, E., et al. The Relationship Between Fracture Behavior and Structural Parameters of HDPE, *Plastics Pipeline Systems for the Millenium*, pp. 349-357 (1998).

Lodefier, Ph., et al. Chemical Heterogeneity of Poly(ethylene terephthalate) As Revealed by Temperature Rising Elution Fractionation and Its Influence on Polymer Thermal Behavior: A Comparison with Poly(ethylene terephthalate-co-isophthalate) *Macromolecules*, vol. 32 No. 21, pp. 7135-7139 (1999).

Hanyu, Aiko et al., Properties and film applications of metallocene-based isotactic polypropylenes, *Journal of Plastic Film & Sheeting*, vol. 15 No. 5, pp. 109-119, (1999).

Scholten F.L., et al. GERG materials bank of PE gas pipe grades. Recent developments, *Proceedings of the International Gas Research Conference*, vol. 3, pp. 257-268, (1998).

Hanyu, Aiko, et al., Properties and film applications of metallocene-based isotactic polypropylenes. *56$^{th}$ Society of Plastics Engineers Annual Technical Conference*, vol. 2, pp. 1887-1891, (1998).

Rätzsch, Radical reactions on polypropylene in the solid state, *Progress in Polymer Science*, Issue 27, pp. 1195-1282 (2002).

J. Dealy, "Structure and Rheology of Molten polymers", *Hanser Publishers Munich*, Germany, pp. 377-386, 2006.

Naguib E. Hani, Fundamental Foaming Mechanisms Governing the Volume Expansion of Extruded Polypropylene Foams, *Journal Applied. Poly. Science*, 91 pp. 2662-2668, (2008).

S. T. Lee, Foam Extrusion Principles and Practice, *Technomic Publishing*, pp. 1-15 (2000).

Virkkunen, Ville, et. al, Tacticity distribution of isotactic polypropylene prepared with heterogeneous Ziegler-Natta Catalyst. 2. Application and analysis of SSA data for polypropylene. *Polymer*, vol. 45, pp. 4623-4631, (2004).

Maria de Fatima Vieira Marques, et, al, Propylene Polymerization using combined Syndio- and isospecific metallocene catalysts supported on silica/MAO, *Journal of Applied Polymer Science*, vol. 99, pp. 628-637, (2006).

Spaleck, Walter, Synthesis and Properties of Metallocene Catalysts for Isotopic Polypropylene Production, *Metallocene-based Polyoefins*, pp. 400-424, (2000).

Product info sheet, Basell Polyolefins Company, "Pro-faxPF814", pp. 1 and 2.

The Dow Company, Commercial Product JQDB-2230NT of Dow, "Technical information for wire and cable" Telecom, pp. 1-2, Mar. 2005.

Product information sheet, Polypropylene Daploy TM WB130HMS High-Melt Strength Polypropylene for Foam Extrusion.

* cited by examiner

Determination of the SHI of "A" at a strain rate of $0.1s^{-1}$
(SHI@$0.1s^{-1}$ is determined to be 2.06)

Deformation Rate versus Strain Hardening

Catalyst particle size distribution via Coulter counter

Measurement of dielectric constant

SIST Curve of C 1

SIST Curve of C 2

SIST Curve of I 1

Definition of excentricity (ECC)

COAXIAL CABLE

RELATED APPLICATIONS

This application is a continuation of International Application Serial No. PCT/EP2007/008278 (International Publication Number WO 2008/037407 A1), having an International filing date of Sep. 24, 2007 entitled "Coaxial Cable". International Application No. PCT/EP2007/008278 claimed priority benefits, in turn, from European Patent Application No. 06020007.8, filed Sep. 25, 2006. International Application No. PCT/EP2007/008278 and European Application No. 06020007.8 are hereby incorporated by reference herein in their entireties.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present technology relates to a cable comprising a cable layer on polypropylene basis with low dielectric loss. Furthermore, the present technology is related to a process for the manufacture of such a cable.

Manufacture of a low attenuation and recyclable cable with high stiffness and high temperature resistance is highly desired.

In certain applications, the communication cables must guarantee a good operating mode. This means that the dielectric loss at certain frequencies needs to be below a certain threshold limit, i.e. be as low as possible. This will enable the cable manufacturer to control the overall losses taking place in the cable. Typically, these losses increase with an increasing frequency. The loss rests upon two main causes: 1. conductor loss and 2. dielectric loss (material). The latter is directly dependent on the frequency whilst the conductor loss is dependent of the square root of the frequency. Thus the higher the frequency of operation, the more important the dielectric losses become. This is typically the case for higher category data cables and radio frequency cables.

Today, polyethylene is used as the material of choice for the insulation of these cables due to the ease of processing and the beneficial electrical properties. The insulation is typically foamed in order to obtain even more beneficial dielectric properties and to ensure dimensional stability. However, in order to assure good operating properties at the required operating temperature, there is a need to crosslink polyethylene either by peroxides or silanes. As a result of crosslinking, there are less recycling options and there is limited processing speed due to dependency on the crosslinking speed.

Thus it is searched for a potential candidate, which can replace the commercial polyethylene on the market, i.e. there is the need to provide cables with low dielectric loss and that do not show the drawbacks of the known cables comprising layers on polyethylene basis.

Polypropylene is in principle considered as such a potential candidate in the field of the communication application area. Polypropylene has the following advantages over polyethylene under particular circumstances:

Lower dielectric constant, allowing downsizing of the cable dimension or decrease of the foaming degree;

Increased hardness;

Decreased dielectric loss at higher frequencies.

However, there is a shared opinion in this technical field that the above stated beneficial properties can be only achieved with highly 'clean' polypropylene materials, i.e. free of the presence of species (e.g. catalyst residues) that can affect the dielectric loss in a negative way.

Accordingly the polypropylene which is nowadays available and fulfils the appreciated high standards, must be after its manufacture troublesome washed to remove any species affecting negatively the dielectric properties.

In addition, of course, any replacement material, i.e. any polypropylene which is suitable to replace polyethylene in this technical field of communication cables, must still have good mechanical and thermal properties enabling failure-free long-run operation of the cable. Furthermore, any improvement in processability should not be achieved on the expense of mechanical properties and any improved balance of processability and mechanical properties should still result in a material of low dielectric loss.

EP 0 893 802 A1 discloses cable coating layers comprising a mixture of a crystalline propylene homopolymer or copolymer and a copolymer of ethylene with at least one alpha-olefin. For the preparation of both polymeric components, a metallocene catalyst can be used. The polymers have acceptable thermal stability. However the dielectric loss of the cable is rather high and additionally the polymers are not suitable to be foamed.

DD 203 915 describes a foam from a composition containing LDPE which shows a low dielectric loss ($<2\times10^{-4}$). However, these products lack temperature resistance and stiffness.

JP 2006 022 276 describes a foam from HDPE which shows a dielectric loss tangent value (tan δ) less than $1.3\times10^{-4}$ at 2.45 GHz. However the temperature resistance of polyethylenes is inadequate because of the low melting temperature. Also, the material does not provide sufficient stiffness.

JP 2001 354 814 describes a polypropylene multiphase composition with one component with a dielectric loss of at least tan $\delta>3\times10^{-3}$. Moreover the materials as disclosed therein cannot be foamed.

EP 1 429 346 A1 describes a polypropylene composition containing a clean polypropylene and a strain hardening polypropylene. However clean polypropylene materials are difficult to make and more importantly, they cannot be foamed unless blended with high melt strength polypropylene (HMS-PP). If blended, the dielectric loss deteriorates dramatically.

BRIEF SUMMARY OF THE INVENTION

Considering the problems outlined above, it is an object of the present technology to provide a cable having a low power loss, being recyclable and having a high stiffness and a high temperature resistance. Preferably such cables comprise a dielectric cable layer that can be foamed to further reduce the power loss.

The present technology is based on the finding that a low power loss in combination with good processability and mechanical properties can be accomplished with a cable comprising at least one cable layer, wherein said layer comprises a polypropylene with a specific degree of branching of the polymeric backbone. In particular, the polypropylene of the present technology shows a specific degree of multi-chain branching, i.e. not only the polypropylene backbone is furnished with a larger number of side chains (branched polypropylene) but also some of the side chains themselves are provided with further side chains. As the branching degree to some extent affects the crystalline structure of the polypropylene, in particular the lamellae thickness distribution, an alternative definition of the polymer of the present technology can be made via its crystallization behaviour. In a first embodiment of the present technology, a cable is provided, wherein said cable comprises a conductor and a cable layer, wherein a. said cable layer comprises polypropylene,
b. said polypropylene is produced in the presence of a metallocene catalyst, and
c. said cable layer and/or said polypropylene has (have),
   aa. a branching index g' of less than 1.00 and
   bb. a strain hardening index (SHI@1 $s^{-1}$) of at least 0.30 measured by a deformation rate d∈/dt of 1.00 $s^{-1}$ at a temperature of 180° C., wherein the strain hardening index (SHI) is defined as the slope of the logarithm to the basis 10 of the tensile stress growth function (lg ($\eta_E^+$)) as function of the logarithm to the basis 10 of the Hencky strain (lg(∈)) in the range of Hencky strains between 1 and 3.

Preferably said cable layer is a dielectric layer.

Preferably said cable layer is free of polyethylene, even more preferred the cable layer comprises a polypropylene as defined above and further defined below as the only polymer component.

Surprisingly, it has been found that cables with such characteristics have superior properties compared to the cables known in the art. Especially, the melt of the cable layer in the extrusion process has a high stability, i.e. the extrusion line can be operated at high line speeds (see Table 8). In addition the inventive cable, in particular its cable layer, is characterized by a rather high stiffness and a low dielectric loss, i.e. by low attenuation "a" (see Table 7).

Certain embodiments of the present technology provide a cable comprising a conductor and a cable layer. The cable layer comprises a polypropylene material. The cable layer and/or the polypropylene material comprise a crystalline fraction crystallizing in the temperature range of 200° C. to 105° C. determined by stepwise isothermal segregation technique. The crystalline fraction comprises a part, wherein, during subsequent melting at a melting rate of 10° C./min, the part melts at or below 130° C. and the part represents at least 20 percent by weight of the crystalline fraction. In certain embodiments, the part melts at or below the temperature T=Tm−3° C., wherein Tm is the melting temperature of the cable layer and/or the polypropylene material, and the part represents at least 45 percent by weight of the crystalline fraction. Certain embodiments provide systems, methods and processes for manufacturing the cable described above and herein. For example, in certain embodiments, the polypropylene material is produced in the presence of a catalyst.

In certain embodiments of the presently described technology, the cable layer and/or the polypropylene material have a branching index g' of less than 1.00 and a strain hardening index of at least 0.30 measured by a deformation rate of 1.00 $s^{-1}$ at a temperature of 180° C., where the strain hardening index is defined as a slope of a logarithm to the basis 10 of a tensile stress growth function as a function of a logarithm to the basis 10 of a Hencky strain in the range of Hencky strains between 1 and 3, for example.

In certain embodiments, the cable layer and/or the polypropylene material have a multi-branching index greater than 0.10. The multi-branching index is defined, for example, as a slope of strain hardening index as a function of the logarithm to the basis 10 of a Hencky strain rate, defined as: (log(d∈/dt)), where d∈/dt is the deformation rate, ∈ is the Hencky strain, and the strain hardening index is measured at a temperature of 180° C. The strain hardening index is defined as a slope of a logarithm to the basis 10 of the tensile stress growth function as a function of a logarithm to the basis 10 of the Hencky strain in the range of Hencky strains between 1 and 3, for example.

DETAILED DESCRIPTION OF THE INVENTION

Figure 1:
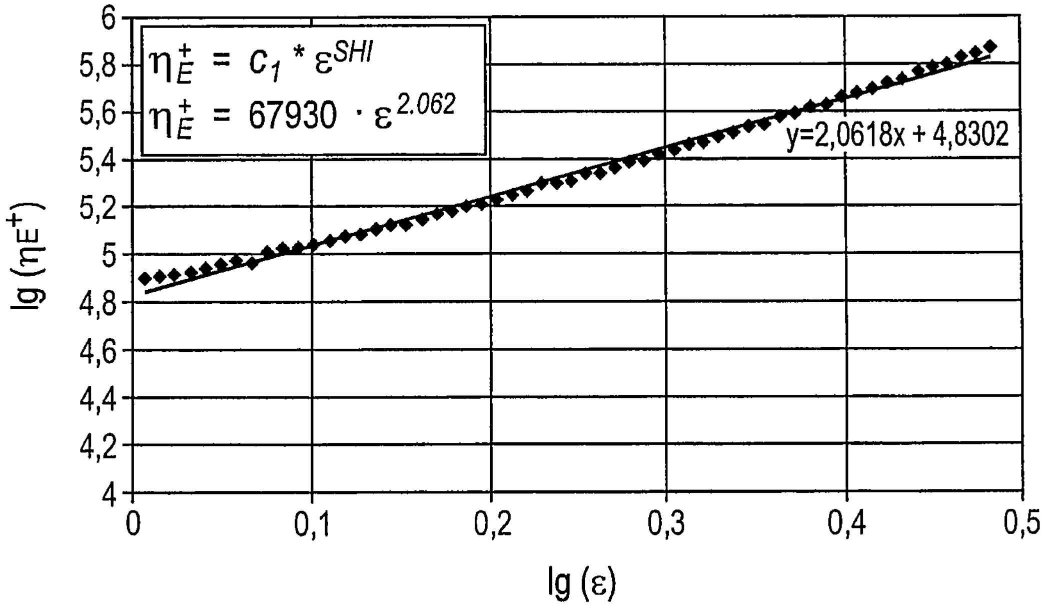
FIG. 1 is a graph depicting the determination of the SHI of "A" at a strain rate of 0.1 $s^{-1}$ (SHI@0.1 $s^{-1}$ is determined to be 2.06).

As stated above, one characteristic of the cable layer and/or the polypropylene component of the inventive cable according to the present technology is in particular its (their) extensional melt flow properties. The extensional flow, or deformation that involves the stretching of a viscous material, is the dominant type of deformation in converging and squeezing flows that occur in typical polymer processing operations. Extensional melt flow measurements are particularly useful in polymer characterization because they are very sensitive to the molecular structure of the polymeric system being tested. When the true strain rate of extension, also referred to as the Hencky strain rate, is constant, simple extension is said to be a "strong flow" in the sense that it can generate a much higher degree of molecular orientation and stretching than flows in simple shear. As a consequence, extensional flows are very sensitive to crystallinity and macro-structural effects, such as multi-chain branching, and as such can be far more descriptive with regard to polymer characterization than other types of bulk rheological measurement which apply shear flow.

Accordingly one preferred requirement of the present technology is that the branching index g' of the inventive polypropylene of the inventive cable shall be less than 1.00, more preferably less than 0.90, still more preferably less than 0.85. In the preferred embodiment, the branching index g' shall be less than 0.85, i.e. 0.80 or less. On the other hand it is preferred that the branching index g' is more than 0.6, still more preferably 0.7 or more. Thus it is preferred that the branching index g' of the polypropylene is in the range of 0.6 to below 1.0, more preferred in the range of more than 0.65 to 0.95, still more preferred in the range of 0.7 to 0.95. The branching index g' defines the degree of branching and correlates with the amount of branches of a polymer. The branching index g' is defined as $g'=[IV]_{br}/[IV]_{lin}$ in which g' is the branching index, $[IV_{br}]$ is the intrinsic viscosity of the branched polypropylene and $[IV]_{lin}$, is the intrinsic viscosity of the linear polypropylene having the same weight average molecular weight (within a range of ±10%) as the branched polypropylene. Thereby, a low g'-value is an indicator for a high branched polymer. In other words, if the g'-value decreases, the branching of the polypropylene increases. Reference is made in this context to B. H. Zimm and W. H.

Stockmeyer, J. Chem. Phys. 17,1301 (1949). This document is herewith incorporated by reference.

When measured on the cable layer, the branching index g' is preferably less than 1.00, more preferably less than 0.90, still more preferably less than 0.80. In the preferred embodiment, the branching index g' of the cable layer shall be less than 0.85.

The intrinsic viscosity needed for determining the branching index g' is measured according to DIN ISO 1628/1, October 1999 (in Decalin at 135° C.).

A further preferred requirement is that the strain hardening index (SHI@1 $s^{-1}$) of the polypropylene of the cable shall be at least 0.30, more preferred at least 0.40, still more preferred at least 0.50. In a preferred embodiment the strain hardening index (SHI@1 $s^{-1}$) is at least 0.55.

The strain hardening index is a measure for the strain hardening behavior of the polypropylene melt. Moreover values of the strain hardening index (SHI@1 $s^{-1}$) of more than 0.10 indicate a non-linear polymer, i.e. a multi-chain branched polymer. In the present technology, the strain hardening index (SHI@1 $s^{-1}$) is measured by a deformation rate $d\in/dt$ of 1.00 $s^{-1}$ at a temperature of 180° C. for determining the strain hardening behavior, wherein the strain hardening index (SHI@1 $s^{-1}$) is defined as the slope of the tensile stress growth function $\eta_E^+$ as a function of the Hencky strain $\in$ on a logarithmic scale between 1.00 and 3.00 (see FIG. 1). Thereby the Hencky strain $\in$ is defined by the formula $\in=\dot{\in}_H\cdot t$, wherein the Hencky strain rate $\dot{\in}_H$ is defined by the formula $$\dot{\varepsilon}_H = \frac{2\cdot\Omega\cdot R}{L_0}$$

with

"$L_0$" is the fixed, unsupported length of the specimen sample being stretched which is equal to the centerline distance between the master and slave drums "R" is the radius of the equi-dimensional windup drums, and "Ω" is a constant drive shaft rotation rate.

In turn the tensile stress growth function $\eta_E^+$ is defined by the formula $$\eta_E^+(\varepsilon) = \frac{F(\varepsilon)}{\dot{\varepsilon}_H\cdot A(\varepsilon)} \text{ with}$$

$$T(\varepsilon) = 2\cdot R\cdot F(\varepsilon) \text{ and}$$

$$A(\varepsilon) = A_0\cdot\left(\frac{d_s}{d_M}\right)^{2/3}\cdot\exp(-\varepsilon) \text{ wherein}$$

the Hencky strain rate $\dot{\in}_H$ is defined as for the Hencky strain $\in$

"F" is the tangential stretching force

"R" is the radius of the equi-dimensional windup drums

"T" is the measured torque signal, related to the tangential stretching force "F"

"A" is the instantaneous cross-sectional area of a stretched molten specimen

"$A_0$" is the cross-sectional area of the specimen in the solid state (i.e. prior to melting), "$d_s$" is the solid state density and "$d_M$" the melt density of the polymer.

When measured on the cable layer, the strain hardening index (SHI@1 $s^{-1}$) is preferably at least 0.30, more preferred of at least 0.40, yet more preferred the strain hardening index (SHI@1 $s^{-1}$) is at least 0.50. In a preferred embodiment the strain hardening index (SHI@1 $s^{-1}$) is at least 0.55.

Another physical parameter which is sensitive to the so-called multi-branching index (MBI) is the attenuation "a" and the strain rate thickening. Thus in the following the multi-branching index (MBI) will be explained in further detail below.

Similarly to the measurement of SHI@1 $s^{-1}$, a strain hardening index (SHI) can be determined at different strain rates. A strain hardening index (SHI) is defined as the slope of the logarithm to the basis 10 of the tensile stress growth function $\eta_E^+$, $\lg(\eta_E^+)$, as function of the logarithm to the basis 10 of the Hencky strain $\in$, $\lg(\in)$, between Hencky strains 1.00 and 3.00 at a at a temperature of 180° C., where a SHI@0.1 $s^{-1}$ is determined with a deformation rate $\dot{\in}_H$ of 0.10 $s^{-1}$, a SHI@0.3 $s^{-1}$ is determined with a deformation rate $\dot{\in}_H$ of 0.30 $s^{-1}$, a SHI@3 $s^{-1}$ is determined with a deformation rate $\dot{\in}_H$ of 3.00 $s^{-1}$, and a SHI@10 $s^{-1}$ is determined with a deformation rate $\dot{\in}_H$ of 10.0 $s^{-1}$. In comparing the strain hardening index (SHI) at those five strain rates $\dot{\in}_H$ of 0.10, 0.30, 1.00, 3.00 and 10.00 $s^{-1}$, the slope of the strain hardening index (SHI) as function of the logarithm to the basis 10 of $\dot{\in}_H$ ($\lg(\dot{\in}_H)$) is a characteristic measure for multi-branching. Therefore, a multi-branching index (MBI) is defined as the slope of the strain hardening index (SHI) as a function of $\lg(\dot{\in}_H)$, i.e. the slope of a linear fitting curve of the strain hardening index (SHI) versus $\lg(\dot{\in}_H)$ applying the least square method, preferably the strain hardening index (SHI) is defined at deformation rates $\dot{\in}_H$ between 0.05 $s^{-1}$ and 20.00 $s^{-1}$, more preferably between 0.10 $s^{-1}$ and 10.00 $s^{-1}$, still more preferably at the deformations rates 0.10, 0.30, 1.00, 3.00 and 10.00 $s^{-1}$. Yet more preferably the SHI-values determined by the deformations rates 0.10, 0.30, 1.00, 3.00 and 10.00 $s^{-1}$ are used for the linear fit according to the least square method when establishing the multi-branching index (MBI).

Hence, a further preferred requirement of the present technology is that the cable layer and/or the polypropylene of the inventive cable has (have) a multi-branching index (MBI) of more than 0.10, more preferably of at least 0.15, still more preferably of at least 0.20, and yet more preferred of at least 0.25. In a preferred embodiment the multi-branching index (MBI) is of about 0.12.

It is in particular preferred that the cable layer and/or the polypropylene of the inventive cable has (have) a branching index g' of less than 1.00, a strain hardening index (SHI@1 $s^{-1}$) of at least 0.30 and multi-branching index (MBI) of more than 0.10. Still more preferred the cable layer and/or the polypropylene of the inventive cable has (have) a branching index g' of less than 0.90, a strain hardening index (SHI@1 $s^{-1}$) of at least 0.40 and multi-branching index (MBI) of more than 0.10. In another preferred embodiment the cable layer and/or the polypropylene of the inventive cable has (have) a branching index g' of less than 0.85, a strain hardening index (SHI@1 $s^{-1}$) of at least 0.30 and multi-branching index (MBI) of about 0.12. In still another preferred embodiment the cable layer and/or the polypropylene of the inventive cable has (have) a branching index g' of about 0.80, a strain hardening index (SHI@1 $s^{-1}$) of at least 0.75 and multi-branching index (MBI) of at least 0.11. In yet another preferred embodiment the cable layer and/or the polypropylene of the inventive cable has (have) a branching index g' of about 0.80, a strain hardening index (SHI@1 $s^{-1}$) of at least 0.70 and multi-branching index (MBI) of about 0.12.

Accordingly, the cable layers and/or the polypropylenes of the inventive cables are in particular characterized by the fact that their strain hardening index (SHI) increases with the deformation rate $\dot{\in}_H$, i.e. a phenomenon which is not observed in other cable layers and/or polypropylenes. Single branched polymer types (so called Y polymers having a backbone with a single long side-chain and an architecture which resembles a "Y") or H-branched polymer types (two polymer chains coupled with a bridging group and an architecture which resemble an "H") as well as linear or short chain branched polymers do not show such a relationship, i.e. the strain hardening index (SHI) is not influenced by the deformation rate (see FIGS. 2 and 3). Accordingly, the strain hardening index (SHI) of known polymers, in particular known polypropylenes and polyethylenes, does not increase or increases only negligibly with increase of the deformation rate ($d\in/dt$). Industrial conversion processes which imply elongational flow operate at very fast extension rates. Hence the advantage of a material which shows more pronounced strain hardening (measured by the strain hardening index SHI) at high strain rates becomes obvious. The faster the material is stretched, the higher the strain hardening index (SHI) and hence the more stable the material will be in conversion. Especially in the fast extrusion process, like in the coating of conductors, the melt of the multi-branched polypropylenes has a high stability. Moreover the inventive cables, in particular the cable layers, are characterized by a rather high stiffness and low dielectric loss.

Further information concerning the measuring methods applied to obtain the relevant data for the branching index g', the tensile stress growth function $\eta_E^+$, the Hencky strain rate $\dot{\in}_H$, the Hencky strain $\in$ and the multi-branching index (MBI) is provided in the example section.

As already indicated above, the polymer architecture and structure determines the crystal structure and the crystallization behaviour of the polymer. With regard to the first embodiment, it is preferred that the cable layer and/or the polypropylene comprise(s) a crystalline fraction crystallizing in the temperature range of 200° C. to 105° C. determined by stepwise isothermal segregation technique (SIST), wherein said crystalline fraction comprises a part which during subsequent-melting at a melting rate of 10° C./min melts at or below 130° C. and said part represents at least 20 wt % (percent by weight) of said crystalline fraction.

It has been recognized that a low attenuation "a" for the cable is achievable in case the polymer used for the cable layer comprises rather high amounts of thin lamellae. The attenuation "a" shows the following relationship to tan δ, i.e. the so called dielectric loss- or dissipation factor, and to the dielectric constant $\in$:

$$a = A\left(\frac{1}{d\log\left(\frac{2s}{d}\right)}\right)\sqrt{f}\sqrt{\varepsilon} + Bf\tan\delta\sqrt{\varepsilon}$$

wherein
a is the attenuation
A and B are constants
d is the conductor diameter
2 s is the distance between two wires
f is the frequency
tan δ is the dielectric loss- or dissipation factor and
$\in$ is the dielectric constant.

Thus it can be easily deducted from the above stated equation that low values of attenuation "a" are inter alia obtained in case the value(s) of dielectric loss factor tan δ and/or the dielectric constant $\in$ is(are) rather low. Polymers with rather high amounts of thin lamellae influence insofar the attenuation "a" positive as the values of dielectric constant $\in$ are kept low. Hence the attenuation "a" can be positive influenced independently from the amount of impurities present in the polypropylene but from its crystalline properties. The stepwise isothermal segregation technique (SIST) provides a possibility to determine the lamellar thickness distribution. Rather high amounts of polymer fractions crystallizing at lower temperatures indicate a rather high amount of thin lamellae. Thus the inventive cable layer and/or the polypropylene of the layer comprise(s) a crystalline fraction crystallizing in the temperature range of 200° C. to 105° C. determined by stepwise isothermal segregation technique (SIST), wherein said crystalline fraction comprises a part which during subsequent-melting at a melting rate of 10° C./min melts at or below 130° C. and said part represents at least 20 wt % of said crystalline fraction, more preferably at least 25 wt %. The stepwise isothermal segregation technique (SIST) is explained in further detail in the example section.

Preferably the cable layer (as defined in the first embodiment of the present technology) comprising polypropylene is further characterized in that, said layer and/or said polypropylene comprise(s) a crystalline fraction crystallizing in the temperature range of 200° C. to 105° C. determined by stepwise isothermal segregation technique (SIST), wherein said crystalline fraction comprises a part which during subsequent melting at a melting rate of 10° C./min melts at or below the temperature T=Tm−3° C., wherein Tm is the melting temperature, and said part represents at least 50 wt-%, more preferably at least 55 wt-%, of said crystalline fraction. The exact definition of Tm is given in the example section.

In a second embodiment, the present technology is related to a cable comprising a conductor and a cable layer, wherein a. said cable layer comprises polypropylene, and b. said cable layer and/or said polypropylene has (have) a strain rate thickening which means that the strain hardening increases with extension rates.

A strain hardening index (SHI) can be determined at different strain rates. A strain hardening index (SHI) is defined as the slope of the tensile stress growth function $\eta_E^+$ as function of the Hencky strain $\in$ on a logarithmic scale between 1.00 and 3.00 at a temperature of 180° C., where a SHI@0.1 $s^{-1}$ is determined with a deformation rate $\dot{\in}_H$ of 0.10 $s^{-1}$, a SHI@0.3 $s^{-1}$ is determined with a deformation rate $\dot{\in}_H$ of 0.30 $s^{-1}$, a SHI@3 $s^{-1}$ is determined with a deformation rate $\dot{\in}_H$ of 3.00 $s^{-1}$, a SHI@10 $s^{-1}$ is determined with a deformation rate $\dot{\in}_H$ of 10.00 $s^{-1}$. In comparing the strain hardening index at those five strain rates $\dot{\in}_H$ of 0.10, 0.30, 1.0, 3.0 and 10.00 $s^{-1}$, the slope of the strain hardening index (SHI) as function of the logarithm to the basis 10 of $\dot{\in}_H$, $\lg(\dot{\in}_H)$, is a characteristic measure for multi-branching. Therefore, a multi-branching index (MBI) is defined as the slope of the strain hardening index (SHI as a function of $\lg(\dot{\in}_H)$, i.e. the slope of a linear fitting curve of the strain hardening index (SHI) versus $\lg(\dot{\in}_H)$ applying the least square method, preferably the strain hardening index (SHI) is defined at deformation rates $\dot{\in}_H$ between 0.05 $s^{-1}$ and 20.0 $s^{-1}$, more preferably between 0.10 $s^{-1}$ and 10.0 $s^{-1}$, still more preferably at the deformations rates 0.10, 0.30, 1.00, 3.00 and 10.0 $s^{-1}$. Yet more preferably the SHI-values determined by the deformations rates 0.10, 0.30, 1.00, 3.00 and 10.0 $s^{-1}$ are used for the linear fit according to the least square method when establishing the multi-branching index (MBI).

Hence, in the second embodiment the cable comprises a conductor and a cable layer, wherein a. said cable layer comprises polypropylene,
b. said cable layer and/or said polypropylene has (have) a multi-branching index (MBI) of more than 0.10, wherein the multi-branching index (MBI) is defined as the slope of strain hardening index (SHI) as function of the logarithm to the basis 10 of the Hencky strain rate (lg(d∈/dt)), wherein:

d∈/dt is the deformation rate;
∈ is the Hencky strain; and
the strain hardening index (SHI) is measured at 180° C., wherein the strain hardening index (SHI) is defined as the slope of the logarithm to the basis 10 of the tensile stress growth function ($lg(\eta_E^+)$) as a function of the logarithm to the basis 10 of the Hencky strain (lg(∈)) in the range of Hencky strains between 1 and 3.

Preferably said cable layer is a dielectric layer.

Preferably the cable layer is free of polyethylene, even more preferred the cable layer comprises a polypropylene as defined above and further defined below as the only polymer component.

Preferably said polypropylene is produced in the presence of a metallocene catalyst, more preferably in the presence of a metallocene catalyst as further defined below.

Surprisingly, it has been found that cables with such characteristics have superior properties compared to the cables known in the art. Especially, the melt of the cable layer in the extrusion process has a high stability, i.e. the extrusion line can be operated at high line speeds (see Table 8). In addition the inventive cable, in particular its cable layer, is characterized by a rather high stiffness and a low dielectric loss, i.e. by low attenuation "a" (see Table 7).

As stated above, one characteristic of the cable layer and/or the polypropylene component of the inventive cable is in particular the extensional melt flow properties. The extensional flow, or deformation that involves the stretching of a viscous material, is the dominant type of deformation in converging and squeezing flows that occur in typical polymer processing operations. Extensional melt flow measurements are particularly useful in polymer characterization because they are very sensitive to the molecular structure of the polymeric system being tested. When the true strain rate of extension, also referred to as the Hencky strain rate, is constant, simple extension is said to be a "strong flow" in the sense that it can generate a much higher degree of molecular orientation and stretching than flows in simple shear. As a consequence, extensional flows are very sensitive to crystallinity and macro-structural effects, such as long-chain branching, and as such can be far more descriptive with regard to polymer characterization than other types of bulk rheological measurement which apply shear flow.

As stated above, the first requirement according to the second embodiment is that the cable layer and/or the polypropylene of the inventive cable has (have) a multi-branching index (MBI) of more than 0.10, more preferably of at least 0.15, still more preferably of at least 0.20, and yet more preferred of at least 0.25. In a preferred embodiment the multi-branching index (MBI) is about 0.12.

As mentioned above, the multi-branching index (MBI) is defined as the slope of the strain hardening index (SHI) as a function of lg(d∈/dt) [d SHI/d lg(d∈/dt)].

Accordingly, the inventive cable layer and/or the polypropylene of the inventive cable is (are) characterized by the fact that their strain hardening index (SHI) increases with the deformation rate $\dot{\in}_H$, i.e. a phenomenon which is not observed in other polypropylenes. Single branched polymer types (so called Y polymers having a backbone with a single long side-chain and an architecture which resembles a "Y") or H-branched polymer types (two polymer chains coupled with a bridging group and an architecture which resemble an "H") as well as linear or short chain branched polymers do not show such a relationship, i.e. the strain hardening index (SHI) is not influenced by the deformation rate (see FIGS. 2 and 3). Accordingly, the strain hardening index (SHI) of known polymers, in particular known polypropylenes and polyethylenes, does not increase or increases only negligibly with increase of the deformation rate (d∈/dt). Industrial conversion processes which imply elongational flow operate at very fast extension rates. Hence the advantage of a material which shows more pronounced strain hardening (measured by the strain hardening index (SHI)) at high strain rates becomes obvious. The faster the material is stretched, the higher the strain hardening index (SHI) and hence the more stable the material will be in conversion. Especially in the fast extrusion process, like in the coating of conductors, the melt of the multi-branched polypropylenes has a high stability. Moreover the inventive cables, in particular the cable layers, are characterized by a rather high stiffness and low dielectric loss.

A further preferred requirement is that the strain hardening index ($SHI@1\ s^{-1}$) of the cable layer and/or the polypropylene of the inventive cable shall be at least 0.30, more preferred of at least 0.40, still more preferred of at least 0.50.

The strain hardening index (SHI) is a measure for the strain hardening behavior of the polymer melt, in particular of the polypropylene melt. In the present technology, the strain hardening index ($SHI@1\ s^{-1}$) has been measured by a deformation rate (d∈/dt) of $1.00\ s^{-1}$ at a temperature of 180° C. for determining the strain hardening behavior, wherein the strain hardening index (SHI) is defined as the slope of the tensile stress growth function $\eta_E^+$ as a function of the Hencky strain ∈ on a logarithmic scale between 1.00 and 3.00 (see FIG. 1). Thereby the Hencky strain ∈ is defined by the formula $\in=\dot{\in}_H \cdot t$, wherein the Hencky strain rate $\dot{\in}_H$ is defined by the formula:

$$\dot{\varepsilon}_H = \frac{2\cdot\Omega\cdot R}{L_0}[s^{-1}]$$

with

"$L_0$" is the fixed, unsupported length of the specimen sample being stretched which is equal to the centerline distance between the master and slave drums,
"R" is the radius of the equi-dimensional windup drums, and
"Ω" is a constant drive shaft rotation rate.

In turn the tensile stress growth function $\eta_E^+$ is defined by the formula $$\eta_E^+(\varepsilon) = \frac{F(\varepsilon)}{\dot{\varepsilon}_H\cdot A(\varepsilon)} \text{ with}$$

$$T(\varepsilon) = 2\cdot R\cdot F(\varepsilon) \text{ and}$$

$$A(\varepsilon) = A_0\cdot\left(\frac{d_s}{d_M}\right)^{2/3}\cdot\exp(-\varepsilon) \text{ wherein}$$

the Hencky strain rate $\dot{\in}_H$ is defined as for the Hencky strain ∈
"F" is the tangential stretching force
"R" is the radius of the equi-dimensional windup drums
"T" is the measured torque signal, related to the tangential stretching force "F"

"A" is the instantaneous cross-sectional area of a stretched molten specimen

"$A_0$" is the cross-sectional area of the specimen in the solid state (i.e. prior to melting), "$d_s$," is the solid state density and "$d_M$" the melt density of the polymer.

In addition, it is preferred that the branching index g' of the inventive polypropylene of the inventive cable shall be less than 1.00, more preferably less than 0.90, still more preferably less than 0.85. In the preferred embodiment, the branching index g' shall be less than 0.85, i.e. 0.80 or less. On the other hand it is preferred that the branching index g' is more than 0.6, still more preferably 0.7 or more. Thus it is preferred that the branching index g' of the polypropylene is in the range of 0.6 to below 1.0, more preferred in the range of more than 0.65 to 0.95, still more preferred in the range of 0.7 to 0.95. The branching index g' defines the degree of branching and correlates with the amount of branches of a polymer. The branching index g' is defined as $g'=[IV]_{br}/[IV]_{lin}$ in which g' is the branching index, $[IV_{br}]$ is the intrinsic viscosity of the branched polypropylene and $[IV]_{lin}$ is the intrinsic viscosity of the linear polypropylene having the same weight average molecular weight (within a range of ±10%) as the branched polypropylene. Thereby, a low g'-value is an indicator for a high branched polymer. In other words, if the g'-value decreases, the branching of the polypropylene increases. Reference is made in this context to B. H. Zimm and W. H. Stockmeyer, J. Chem. Phys. 17,1301 (1949). This document is herewith incorporated by reference.

When measured on the cable layer, the branching index g' is preferably less than 1.00, more preferably less than 0.90, still more preferably less than 0.80. In the preferred embodiment, the branching index g' of the cable layer shall be less than 0.85.

The intrinsic viscosity needed for determining the branching index g' is measured according to DIN ISO 1628/1, October 1999 (in Decalin at 135° C.).

Further information concerning the measuring methods applied to obtain the relevant data for the a multi-branching index (MBI), the tensile stress growth function $\eta_E^+$, the Hencky strain rate $\dot{\epsilon}_H$, the Hencky strain $\epsilon$ and the branching index g is provided in the example section.

It is in particular preferred that the cable layer and/or the polypropylene of the inventive cable has (have) a branching index g' of less than 1.00, a strain hardening index (SHI@1 $s^{-1}$) of at least 0.30 and multi-branching index (MBI) of more than 0.10. Still more preferred the cable layer and/or the polypropylene of the inventive cable has (have) a branching index g' of less than 0.90, a strain hardening index (SHI@1 $s^{-1}$) of at least 0.40 and multi-branching index (MBI) of more than 0.10. In another preferred embodiment the cable layer and/or the polypropylene of the inventive cable has (have) a branching index g' of less than 0.85, a strain hardening index (SHI@1 $s^{-1}$) of at least 0.30 and multi-branching index (MBI) of about 0.12. In still another preferred embodiment the cable layer and/or the polypropylene of the inventive cable has (have) a branching index g' of about 0.80, a strain hardening index (SHI@1 $s^{-1}$) of at least 0.75 and multi-branching index (MBI) of at least 0.11. In yet another preferred embodiment the cable layer and/or the polypropylene of the inventive cable has (have) a branching index g' of about 0.80, a strain hardening index (SHI@1 $s^{-1}$) of at least 0.70 and multi-branching index (MBI) of about 0.12.

As already indicated above, the polymer architecture and structure determines the crystal structure and the crystallization behaviour of the polymer. With regard to the first embodiment, it is preferred that the cable layer and/or the polypropylene comprise(s) a crystalline fraction crystallizing in the temperature range of 200 to 105° C. determined by stepwise isothermal segregation technique (SIST), wherein said crystalline fraction comprises a part which during subsequent-melting at a melting rate of 10° C./min melts at or below 130° C. and said part represents at least 20 wt % of said crystalline fraction.

It has been recognized that a low attenuation "a" for the cable is achievable in case the polymer used for the cable layer comprises rather high amounts of thin lamellae. The attenuation "a" shows the following relationship to tan δ, i.e. the so called dielectric loss- or dissipation factor, and to the dielectric constant $\epsilon$:

$$a = A\left(\frac{1}{d\log\left(\frac{2s}{d}\right)}\right)\sqrt{f}\,\sqrt{\varepsilon} + Bf\tan\delta\sqrt{\varepsilon}$$

wherein a is the attenuation

A and B are constants d is the conductor diameter 2 s is the distance between two wires f is the frequency tan δ is the dielectric loss- or dissipation factor and $\epsilon$ is the dielectric constant.

Thus it can be easily deducted from the above stated equation that low values of attenuation "a" are inter alia obtained in cases where the value(s) of dielectric loss factor tan δ and/or the dielectric constant $\epsilon$ is rather low. Polymers with rather high amounts of thin lamellae influence insofar the attenuation "a" positive as the values of dielectric constant $\epsilon$ are kept low. Hence the attenuation "a" can be positive influenced independently from the amount of impurities present in the polypropylene but from its crystalline properties. The stepwise isothermal segregation technique (SIST) provides a possibility to determine the lamellar thickness distribution. Rather high amounts of polymer fractions crystallizing at lower temperatures indicate a rather high amount of thin lamellae. Thus the inventive cable layer and/or the polypropylene of the layer comprise(s) a crystalline fraction crystallizing in the temperature range of 200° C. to 105° C. determined by stepwise isothermal segregation technique (SIST), wherein said crystalline fraction comprises a part which during subsequent-melting at a melting rate of 10° C./min melts at or below 130° C. and said part represents of at least 20 wt % of said crystalline fraction, more preferably of at least 25 wt %. The stepwise isothermal segregation technique (SIST) is explained in further detail in the example section.

Preferably the cable layer (as defined in the second embodiment of the present technology) comprising polypropylene is further characterized in that, said layer and/or said polypropylene comprise(s) a crystalline fraction crystallizing in the temperature range of 200° C. to 105° C. determined by stepwise isothermal segregation technique (SIST), wherein said crystalline fraction comprises a part which during subsequent melting at a melting rate of 10° C./min melts at or below the temperature T=Tm−3° C., wherein Tm is the melting temperature, and said part represents at least 45 wt-%, more preferably at least 50 wt-%, yet more preferably at least 50 wt-%, of said crystalline fraction. Tm is explained in further detail in the example section.

According to a third embodiment of the present technology, a cable is provided, wherein the cable comprises a conductor and a cable layer, and wherein a. said cable layer comprises polypropylene, and
b. said cable layer and/or said polypropylene comprise(s) a crystalline fraction crystallizing in the temperature range of 200 to 105° C. determined by stepwise isothermal segregation technique (SIST), wherein said crystalline fraction comprises a part which during subsequent melting at a melting rate of 10° C./min melts at or below 130° C. and said part represents at least 20 wt-% of said crystalline fraction.

As an alternative of the third embodiment of the present technology, a cable is provided, wherein said cable comprises a conductor and a cable layer, and wherein a. said cable layer comprises polypropylene,
b. said cable layer and/or said polypropylene comprise(s) a crystalline fraction crystallizing in the temperature range of 200° C. to 105° C. determined by stepwise isothermal segregation technique (SIST), wherein said crystalline fraction comprises a part which during subsequent melting at a melting rate of 10° C./min melts at or below the temperature T=Tm−3° C., wherein Tm is the melting temperature, and said part represents at least 45 wt-% of said crystalline fraction, and
c. said cable layer and/or said polypropylene is foamable.

The exact measuring method for Tm is given in the example section.

Surprisingly, it has been found that cables with such characteristics, i.e. cables according to the third embodiment, have superior properties compared to the cables known in the art. Especially, the melt of the cable layer in the extrusion process has a high stability, i.e. the extrusion line can be operated at high line speeds (see Table 8). In addition the inventive cable, in particular its cable layer, is characterized by a rather high stiffness and a low dielectric loss, i.e. by low attenuation "a" (see Table 7).

It has been in particular recognized that a low attenuation "a" for the cable is achievable in case the polymer used for the cable layer comprises rather high amounts of thin lamellae. The attenuation "a" shows the following relationship to tan δ, i.e. the so called dielectric loss- or dissipation factor, and to the dielectric constant ∈:

$$a = A\left(\frac{1}{d\log\left(\frac{2s}{d}\right)}\right)\sqrt{f}\,\sqrt{\varepsilon} + Bf\tan\delta\sqrt{\varepsilon}$$

wherein
a is the attenuation
A and B are constants
d is the conductor diameter
2 s is the distance between two wires
f is the frequency
tan δ is the dielectric loss- or dissipation factor and
∈ is the dielectric constant.

Thus it can be easily deducted from the above stated equation that low values of attenuation "a" are inter alia obtained in case the value(s) of dielectric loss factor tan δ and/or the dielectric constant ∈ is rather low. Polymers with rather high amounts of thin lamellae influence insofar the attenuation "a" positive as the values of dielectric constant ∈ are kept low. Hence the attenuation "a" can be positive influenced independently from the amount of impurities present in the polypropylene but from its crystalline properties. The stepwise isothermal segregation technique (SIST) provides a possibility to determine the lamellar thickness distribution. Rather high amounts of polymer fractions crystallizing at lower temperatures indicate a rather high amount of thin lamellae. Thus the inventive cable layer and/or the polypropylene of the layer comprise(s) a crystalline fraction crystallizing in the temperature range of 200 to 105° C. determined by stepwise isothermal segregation technique (SIST), wherein said crystalline fraction comprises a part which during subsequent-melting at a melting rate of 10° C./min melts at or below 130° C. and said part represents of at least 20 wt % of said crystalline fraction, more preferably of at least 25 wt %. The stepwise isothermal segregation technique (SIST) is explained in further detail in the example section.

Preferably said layers of the third embodiment are dielectric layers.

Preferably the cable layer of the third embodiment is free of polyethylene, even more preferred the cable layer comprises a polypropylene as defined above and further defined below as the only polymer component.

Preferably said polypropylene is produced in the presence of a metallocene catalyst, more preferably in the presence of a metallocene catalyst as further defined below.

In addition it is preferred that the inventive cable layer and/or the polypropylene of the inventive cable has (have) a strain rate thickening which means that the strain hardening increases with extension rates. A strain hardening index (SHI) can be determined at different strain rates. A strain hardening index (SHI) is defined as the slope of the tensile stress growth function $\eta_E^+$ as function of the Hencky strain ∈ on a logarithmic scale between 1.00 and 3.00 at a at a temperature of 180° C., where a SHI@0.1 $s^{-1}$ is determined with a deformation rate $\dot{\epsilon}_H$ of 0.10 $s^{-1}$, a SHI@0.3 $s^{-1}$ is determined with a deformation rate $\dot{\epsilon}_H$ of 0.30 $s^{-1}$, a SHI@1.0 $s^{-1}$ is determined with a deformation rate $\dot{\epsilon}_H$ of 1.00 $s^{-1}$, a SHI@3 $s^{-1}$ is determined with a deformation rate $\dot{\epsilon}_H$ of 3.00 $s^{-1}$, a SHI@10 $s^{-1}$ is determined with a deformation rate $\dot{\epsilon}_H$ of 10.0 $s^{-1}$. In comparing the strain hardening index at those five strain rates $\dot{\epsilon}_H$ of 0.10, 0.30, 1.0, 3.0 and 10.00 $s^{-1}$, the slope of the strain hardening index (SHI) as function of the logarithm to the basis 10 of $\dot{\epsilon}_H$, lg($\dot{\epsilon}_H$), is a characteristic measure for multi-branching. Therefore, a multi-branching index (MBI) is defined as the slope of the strain hardening index (SHI as a function of lg($\dot{\epsilon}_H$), i.e. the slope of a linear fitting curve of the strain hardening index (SHI) versus lg($\dot{\epsilon}_H$) applying the least square method, preferably the strain hardening index (SHI) is defined at deformation rates $\dot{\epsilon}_H$ between 0.05 $s^{-1}$ and 20.0 $s^{-1}$, more preferably between 0.10 s and 10.0 $s^{-1}$, still more preferably at the deformations rates 0.10, 0.30, 1.00, 3.00 and 10.00 $s^{-1}$. Yet more preferably the SHI-values determined by the deformations rates 0.10, 0.30, 1.00, 3.00 and 10.00 $s^{-1}$ are used for the linear fit according to the least square method when establishing the multi-branching index (MBI).

Hence, it is preferred that the cable layer and/or the polypropylene of the inventive cable has (have) a multi-branching index (MBI) of more than 0.10, more preferably of at least 0.15, still more preferably of at least 0.20, and yet more preferred of at least 0.25. In a preferred embodiment the multi-branching index (MBI) is of about 0.12.

Hence, the cable layer and/or the polypropylene component of the inventive cable according to the present technology is (are) characterized in particular by extensional melt flow properties. The extensional flow, or deformation that involves the stretching of a viscous material, is the dominant type of deformation in converging and squeezing flows that occur in typical polymer processing operations. Extensional melt flow measurements are particularly useful in polymer characterization because they are very sensitive to the molecular structure of the polymeric system being tested.

When the true strain rate of extension, also referred to as the Hencky strain rate, is constant, simple extension is said to be a "strong flow" in the sense that it can generate a much higher degree of molecular orientation and stretching than flows in simple shear. As a consequence, extensional flows are very sensitive to crystallinity and macro-structural effects, such as long-chain branching, and as such can be far more descriptive with regard to polymer characterization than other types of bulk rheological measurement which apply shear flow.

As mentioned above, the multi-branching index (MBI) is defined as the slope of the strain hardening index (SHI) as a function of lg(d∈/dt) [d SHI/d lg(d∈/dt)].

Accordingly, the cable layer and/or the polypropylene of the inventive cable is (are) preferably characterized by the fact that their strain hardening index (SHI) increases with the deformation rate $\dot{\in}_H$, i.e. a phenomenon which is not observed in other polypropylenes. Single branched polymer types (so called Y polymers having a backbone with a single long side-chain and an architecture which resembles a "Y") or H-branched polymer types (two polymer chains coupled with a bridging group and an architecture which resemble an "H") as well as linear or short chain branched polymers do not show such a relationship, i.e. the strain hardening index (SHI) is not influenced by the deformation rate (see FIGS. 2 and 3). Accordingly, the strain hardening index (SHI) of known polymers, in particular known polypropylenes and polyethylenes, does not increase or increases only negligibly with increase of the deformation rate (d∈/dt). Industrial conversion processes which imply elongational flow operate at very fast extension rates. Hence the advantage of a material which shows more pronounced strain hardening (measured by the strain hardening index (SHI)) at high strain rates becomes obvious. The faster the material is stretched, the higher the strain hardening index (SHI) and hence the more stable the material will be in conversion. Especially in the fast extrusion process, like in the coating of conductors, the melt of the multi-branched polypropylenes has a high stability. Moreover the inventive cables, in particular the cable layers, are characterized by a rather high stiffness and low dielectric loss.

A further preferred requirement is that the strain hardening index (SHI@1 $s^{-1}$) of the cable layer and/or the polypropylene of the inventive cable shall be at least 0.30, more preferred at least 0.40, still more preferred at least 0.50.

The strain hardening index (SHI) is a measure for the strain hardening behavior of the polymer melt, in particular of the polypropylene melt. In the present technology, the strain hardening index (SHI@1 $s^{-1}$) has been measured by a deformation rate (d∈/dt) of 1.00 $s^{-1}$ at a temperature of 180° C. for determining the strain hardening behavior, wherein the strain hardening index (SHI) is defined as the slope of the tensile stress growth function $\eta_E^+$ as a function of the Hencky strain ∈ on a logarithmic scale between 1.00 and 3.00 (see FIG. 1). Thereby the Hencky strain ∈ is defined by the formula $\in=\dot{\in}_H \cdot t$, wherein the Hencky strain rate $\dot{\in}_H$ is defined by the formula $$\dot{\varepsilon}_H = \frac{2 \cdot \Omega \cdot R}{L_0} [s^{-1}]$$

with

"$L_0$" is the fixed, unsupported length of the specimen sample being stretched which is equal to the centerline distance between the master and slave drums, "R" is the radius of the equi-dimensional windup drums, and "Ω" is a constant drive shaft rotation rate.

In turn the tensile stress growth function $\eta_E^+$ is defined by the formula $$\eta_E^+(\varepsilon) = \frac{F(\varepsilon)}{\dot{\varepsilon}_H \cdot A(\varepsilon)} \text{ with}$$

$$T(\varepsilon) = 2 \cdot R \cdot F(\varepsilon) \text{ and}$$

$$A(\varepsilon) = A_0 \cdot \left(\frac{d_s}{d_M}\right)^{2/3} \cdot \exp(-\varepsilon) \text{ wherein}$$

the Hencky strain rate $\dot{\in}_H$ is defined as for the Hencky strain ∈

"F" is the tangential stretching force

"R" is the radius of the equi-dimensional windup drums

"T" is the measured torque signal, related to the tangential stretching force "F"

"A" is the instantaneous cross-sectional area of a stretched molten specimen

"$A_0$" is the cross-sectional area of the specimen in the solid state (i.e. prior to melting), "$d_s$" is the solid state density and "$d_M$" the melt density of the polymer.

In addition, it is preferred that the branching index g' of the inventive polypropylene of the inventive cable shall be less than 1.00, more preferably less than 0.90, still more preferably less than 0.85. In the preferred embodiment, the branching index g' shall be less than 0.85, i.e. 0.80 or less. On the other hand it is preferred that the branching index g' is more than 0.6, still more preferably 0.7 or more. Thus it is preferred that the branching index g' of the polypropylene is in the range of 0.6 to below 1.0, more preferred in the range of more than 0.65 to 0.95, still more preferred in the range of 0.7 to 0.95. The branching index g' defines the degree of branching and correlates with the amount of branches of a polymer. The branching index g' is defined as $g'=[IV]_{br}/[IV]_{lin}$ in which g' is the branching index, $[IV_{br}]$ is the intrinsic viscosity of the branched polypropylene and $[IV]_{lin}$ is the intrinsic viscosity of the linear polypropylene having the same weight average molecular weight (within a range of ±10%) as the branched polypropylene. Thereby, a low g'-value is an indicator for a high branched polymer. In other words, if the g'-value decreases, the branching of the polypropylene increases. Reference is made in this context to B. H. Zimm and W. H. Stockmeyer, J. Chem. Phys. 17,1301 (1949). This document is herewith incorporated by reference.

When measured on the cable layer, the branching index g' is preferably less than 1.00, more preferably less than 0.90, still more preferably less than 0.80. In the preferred embodiment, the branching index g' of the cable layer shall be less than 0.85.

The intrinsic viscosity needed for determining the branching index g' is measured according to DIN ISO 1628/1, October 1999 (in Decalin at 135° C.).

Further information concerning the measuring methods applied to obtain the relevant data for the a multi-branching index (MBI), the tensile stress growth function $\eta_E^+$, the Hencky strain rate $\dot{\in}_H$, the Hencky strain ∈ and the branching index g' is provided in example section.

It is in particular preferred that the cable layer and/or the polypropylene of the inventive cable has (have) a branching index g' of less than 1.00, a strain hardening index (SHI@1 $s^{-1}$) of at least 0.30 and multi-branching index (MBI) of more than 0.10. Still more preferred the cable layer and/or the polypropylene of the inventive cable has (have) a branching index g' of less than 0.90, a strain hardening index (SHI@1

$s^{-1}$) of at least 0.40 and multi-branching index (MBI) of more than 0.10. In another preferred embodiment the cable layer and/or the polypropylene of the inventive cable has (have) a branching index g' of less than 0.85, a strain hardening index (SHI@1 $s^{-1}$) of at least 0.30 and multi-branching index (MBI) of about 0.12. In still another preferred embodiment the cable layer and/or the polypropylene of the inventive cable has (have) a branching index g' of about 0.80, a strain hardening index (SHI@1 $s^{-1}$) of at least 0.75 and multi-branching index (MBI) of at least 0.11. In yet another preferred embodiment the cable layer and/or the polypropylene of the inventive cable has (have) a branching index g' of about 0.80, a strain hardening index (SHI@1 $s^{-1}$) of at least 0.70 and multi-branching index (MBI) of about 0.12.

The further features mentioned below apply to all embodiments described above, i.e. the first, the second and the third embodiment as defined above.

Preferably the cable layer and/or the polypropylene of the inventive cable is (are) foamable. The term "foamable" according to the present technology is the ability of the cable layer and/or the polypropylene to have its (their) density reduced after its (their) physical and/or chemical expanding. In other words the cable layer and/or the polypropylene must be expandable and thereby reducing its (their) density. More preferably the term "formable" means that the cable layer and/or the polypropylene can be expanded by chemical or physical foaming to a densitiy below 450 kg/$m^3$, more preferably below 400 kg/$m^3$, yet more preferably below 250 kg/$m^3$.

Preferably the polypropylene used for the cable layer shall be not cross-linked as it can be done to improve the process properties of the polypropylene. However the cross-linking is detrimental in many aspects. Inter alia the manufacture of said products is difficult to obtain and reduces in addition the possibility to expand (to foam) the cable layer and/or the polypropylene.

In addition, it is preferred that the crystalline fraction which crystallizes between 200 to 105° C. determined by stepwise isothermal segregation technique (SIST) is at least 90 wt.-% of the total cable layer and/or the total polypropylene, more preferably at least 95 wt.-% of the total layer and/or the total polypropylene and yet more preferably 98 wt.-% of the total layer and/or the total polypropylene.

Preferably the polymer according to the present technology can be produced with low levels of impurities, i.e. low levels of aluminium (Al) residue and/or low levels of silicon residue (Si) and/or low levels of boron (B) residue. As stated above, low values of attenuation "a" are dependent on many factors defined by the formula $$a = A\left(\frac{1}{d\log\left(\frac{2s}{d}\right)}\right)\sqrt{f}\sqrt{\varepsilon} + Bf\tan\delta\sqrt{\varepsilon}$$

wherein a is the attenuation

A and B are constants d is the conductor diameter 2 s the distance between two wires f is the frequency tan δ is the dielectric loss- or dissipation factor and ∈ is the dielectric constant.

Thus not only low values of the dielectric constant ∈ influence positively the attenuation "a" but also low values of dielectric loss factor tan δ. This value is inter alia dependent on the purity of the used polypropylene, i.e. polypropylenes with rather high amounts of residues yield to rather high values of tan δ. Hence it is appreciated to have a cable layer and/or a polypropylene characterized by high purity. Even more preferred, because of economical reasons, such a high purity shall be obtained without any additional washing steps.

Accordingly the aluminium residue content and/or silicon residue content and/or boron residue content of the cable layer and/or of the polypropylene is(are) preferably less than 25.00 ppm (each, i.e. of Al, Si, B). Still more preferably the aluminium residue content and/or silicon residue content and/or boron residue content of the cable layer and/or of the polypropylene is(are) preferably less than 20.00 ppm (each, i.e. of Al, Si, B). Yet more preferably the aluminium residue content and/or silicon residue content and/or boron residue content of the cable layer and/or of the polypropylene is(are) preferably less than 15.00 ppm (each, i.e. of Al, Si, B). In a preferred embodiment no residues of aluminium and/or silicon and/or boron (is) are detectable in the cable layer and/or in the polypropylene.

Preferably, the cable layer and/or the polypropylene component of the inventive cable of the present technology has a tensile modulus of at least 700 MPa, more preferably of at least 900 MPa, yet more preferably of at least 1000 MPa, measured according to ISO 527-2 at a cross head speed of 1 mm/min.

Furthermore, it is preferred that the polypropylene has a melt flow rate (MFR) given in a specific range. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined dye under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$. Accordingly, it is preferred that in the present technology the polypropylene of the cable has an $MFR_2$ in a range of 0.01 to 100.00 g/10 min, more preferably of 0.01 to 30.00 g/10 min, still more preferred of 0.05 to 20 g/10 min. In a preferred embodiment, the $MFR_2$ is in a range of 1.00 to 11.00 g/10 min. In another preferred embodiment, the $MFR_2$ is in a range of 1.00 to 4.00 g/10 min. In a preferred embodiment the $MFR_2$ is up to 30.00 g/10 min.

The molecular weight distribution (MWD) (also determined herein as polydispersity) is the relation between the numbers of molecules in a polymer and the individual chain length. The molecular weight distribution (MWD) is expressed as the ratio of weight average molecular weight ($M_w$) and number average molecular weight ($M_n$). The number average molecular weight ($M_n$) is an average molecular weight of a polymer expressed as the first moment of a plot of the number of molecules in each molecular weight range against the molecular weight. In effect, this is the total molecular weight of all molecules divided by the number of molecules. In turn, the weight average molecular weight ($M_w$) is the first moment of a plot of the weight of polymer in each molecular weight range against molecular weight.

The number average molecular weight ($M_n$) and the weight average molecular weight ($M_w$) as well as the molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

It is preferred that the cable layer of the present technology comprises a polypropylene which has a weight average molecular weight ($M_w$) from 10,000 to 2,000,000 g/mol, more preferably from 20,000 to 1,500,000 g/mol.

The number average molecular weight ($M_n$) of the polypropylene is preferably in the range of 5,000 to 1,000,000 g/mol, more preferably from 10,000 to 750,000 g/mol.

As a broad molecular weight distribution (MWD) improves the processability of the polypropylene the molecular weight distribution (MWD) is preferably up to 20.00, more preferably up to 10.00, still more preferably up to 8.00. However a rather broad molecular weight distribution stimulates surface roughness from pronounced melt relaxation phenomena after the extrusion die and hence deteriorates the quality of the extruded polypropylene layer. Therefore, in an alternative embodiment the molecular weight distribution (MWD) is preferably between 1.00 to 8.00, still more preferably in the range of 1.00 to 6.00, yet more preferably in the range of 1.00 to 4.00.

More preferably, the polypropylene of the cable layer according to the present technology shall be isotactic, i.e. shall have a rather high isotacticity measured by meso pentad concentration (also referred to herein as pentad concentration), i.e. higher than 91%, more preferably higher than 93%, still more preferably higher than 94% and most preferably higher than 95%. On the other hand pentad concentration shall be not higher than 99.5%. The pentad concentration is an indicator for the narrowness in the stereoregularity distribution of the polypropylene and measured by NMR-spectroscopy.

In addition, it is preferred that the polypropylene of the inventive cable has a melting temperature Tm of higher than 120° C. It is in particular preferred that the melting temperature is higher than 120° C. if the polypropylene is a polypropylene copolymer as defined below. In turn, in case the polypropylene is a polypropylene homopolymer as defined below, it is preferred, that polypropylene has a melting temperature of higher than 140° C., more preferred higher than 145° C.

Not only the polypropylene itself but also the melting temperature of the cable layer shall preferably exceed a specific temperature. Hence it is preferred that the cable layer has a melting temperature Tm of higher than 120° C. It is in particular preferred that the melting temperature of the cable layer is higher than 120° C., more preferably higher than 130° C., and yet more preferred higher than 135° C., in case the polypropylene is a propylene copolymer as defined in the present technology. In turn, if the polypropylene is a propylene homopolymer as defined in the present technology, it is preferred that the melting temperature of the cable layer is higher than 140° C. and more preferably higher than 145° C.

Xylene solubles are the part of the polymer soluble in cold xylene determined by dissolution in boiling xylene and letting the insoluble part crystallize from the cooling solution (for the method see below in the experimental part). The xylene solubles fraction contains polymer chains of low stereo-regularity and is an indication for the amount of non-crystalline areas.

Thus it is preferred that the cable layer and/or the polypropylene of the inventive cable has xylene solubles preferably less than 2.00 wt.-%, more preferably less than 1.00 wt.-% and still more preferably less than 0.80 wt.-%.

In a preferred embodiment the polypropylene as defined above (and further defined below) is preferably unimodal. In another preferred embodiment the polypropylene as defined above (and further defined below) is preferably multimodal, more preferably bimodal.

"Multimodal" or "multimodal distribution" describes a distribution that has several relative maxima (contrary to unimodal having only one maximum). In particular, the expression "modality of a polymer" refers to the form of its molecular weight distribution (MWD) curve, i.e. the appearance of the graph of the polymer weight fraction as a function of its molecular weight. If the polymer is produced in the sequential step process, i.e. by utilizing reactors coupled in series, and using different conditions in each reactor, the different polymer fractions produced in the different reactors each have their own molecular weight distribution which may considerably differ from one another. The molecular weight distribution curve of the resulting final polymer can be seen at a super-imposing of the molecular weight distribution curves of the polymer fraction which will, accordingly, show a more distinct maxima, or at least be distinctively broadened compared with the curves for individual fractions.

A polymer showing such molecular weight distribution curve is called bimodal or multimodal, respectively.

In case the polypropylene of the cable layer is not unimodal it is preferably bimodal.

The polypropylene of the cable layer according to the present technology can be a homopolymer or a copolymer. In case the polypropylene is unimodal the polypropylene is preferably a polypropylene copolymer. In turn in case the polypropylene is multimodal, more preferably bimodal, the polypropylene can be a polypropylene homopolymer as well as a polypropylene copolymer. Furthermore, it is preferred that at least one of the fractions of the multimodal polypropylene is a multi-chain branched polypropylene, preferably a multi-chain branched polypropylene copolymer, as defined herein.

The expression polypropylene homopolymer as used in the present technology relates to a polypropylene that consists substantially, i.e. of at least 97 wt %, preferably of at least 99 wt %, and most preferably of at least 99.8 wt % of propylene units. In a preferred embodiment only propylene units in the polypropylene homopolymer are detectable. The comonomer content can be measured with FT infrared spectroscopy. Further details are provided below in the examples.

In case the polypropylene used for the preparation of the cable layer is a propylene copolymer, it is preferred that the comonomer is ethylene. However, also other comonomers known in the art, like 1-butene, are suitable. Preferably, the total amount of comonomer, more preferably ethylene, in the propylene copolymer is up to 10 mol %, more preferably up to 8 mol %, and even more preferably up to 6 mol %.

In a preferred embodiment, the polypropylene is a propylene copolymer comprising a polypropylene matrix and an ethylene-propylene rubber (EPR).

The polypropylene matrix can be a homopolymer or a copolymer, more preferably multimodal, i.e. bimodal, homopolymer or a multimodal, i.e. bimodal, copolymer. In case the polypropylene matrix is a propylene copolymer, then it is preferred that the comonomer is ethylene or 1-butene. However, also other comonomers known in the art are suitable. The preferred amount of comonomer, more preferably ethylene, in the polypropylene matrix is up to 8.00 mol %. In case the propylene copolymer matrix has ethylene as the comonomer component, it is in particular preferred that the amount of ethylene in the matrix is up to 8.00 mol %, more preferably less than 6.00 mol %. In case the propylene copolymer matrix has butene as the comonomer component, it is in particular preferred that the amount of butene in the matrix is up to 6.00 mol %, more preferably less than 4.00 mol %.

Preferably, the ethylene-propylene rubber (EPR) in the total propylene copolymer is less than or equal 50 wt %, more preferably less than or equal 40 wt %. Yet more preferably the amount of ethylene-propylene rubber (EPR) in the total propylene copolymer is in the range of 10 to 50 wt %, still more preferably in the range of 10 to 40 wt %.

In addition, it is preferred that the multimodal or bimodal polypropylene copolymer comprises a polypropylene homopolymer matrix being a multi-chain branched polypropylene as defined above and an ethylene-propylene rubber (EPR) with an ethylene-content of up to 50 wt %.

In addition, it is preferred that the polypropylene as defined above is produced in the presence of the catalyst as defined below. Furthermore, for the production of the polypropylene of the inventive cable as defined above, the process as stated below is preferably used.

Preferably a metallocene catalyst is used for the polypropylene of the inventive cable. It is in particular preferred that the polypropylene according to the present technology is obtainable by a new catalyst system as defined below.

Moreover, the cable layer as defined in the present technology can be an insulation layer, preferably a dielectric layer, or a semiconductive layer. In case it is a semiconductive layer, it preferably comprises carbon black. However it is preferred that the cable layer is a dielectric layer. Still more preferred the cable layer is a dielectric layer comprising in addition metal deactivator(s), like Irganox MD 1024 and/or Irganox PS 802 FL.

The cable as described in the present technology is preferably a coaxial cable or a pair cable.

A typical coaxial cable comprises an inner conductor made of copper or aluminium, a dielectric layer made of a polymeric material (in the present technology the dielectric layer is the cable layer as defined herein), and preferably outer conductors made preferably of copper or aluminium. Examples of outer conductors are metallic screens, foils or braids. Furthermore, the coaxial cable may comprise a skin layer between the inner conductor and the dielectric layer to improve adherence between inner conductor and dielectric layer and thus improve mechanical integrity of the cable.

Even more preferred the cable is a coaxial cable, e.g. a data cable or a radio frequency cable. Still more preferred the cable layer as defined in the present technology is used as a dielectric layer in the coaxial cable or in the pair cable, e.g. in the data cable and/or in the radio frequency cable.

Thus in one specific embodiment the present technology provides a cable, e.g. a coaxial or triaxial cable, comprising a dielectric layer which is based, preferably is, the cable layer as defined in the present technology. More preferably the cable layer being said dielectric layer is expanded, i.e. foamed.

More preferably the cable, i.e. the coaxial or triaxial cable, has a dielectric loss tangent value (tan δ) of less than $100\times10^{-6}$, still more preferably of less than $90\times10^{-6}$, yet more preferably of less than $80\times10^{-6}$, still yet more preferably of less than $75\times10^{-6}$, determined by a frequency of 1.8 GHz. In a preferred embodiment, preferably the cable, i.e. the coaxial or triaxial cable, has a dielectric loss tangent value (tan δ) of less than 70 determined by a frequency of 1.8 GHz.

In the following the catalyst and the catalyst system used for the manufacture of the polypropylene of the inventive cable as well as the manufacture of the polypropylene, the cable layer and the cable according to the present technology is provided.

This new catalyst system comprises an asymmetric catalyst, whereby the catalyst system has a porosity of less than 1.40 ml/g, more preferably less than 1.30 ml/g and most preferably less than 1.00 ml/g. The porosity has been measured according to DIN 66135 ($N_2$). In another preferred embodiment the porosity is not detectable when determined with the method applied according to DIN 66135 ($N_2$).

An asymmetric catalyst according to the present technology is a metallocene compound comprising at least two organic ligands which differ in their chemical structure. More preferably the asymmetric catalyst according to the present technology is a metallocene compound comprising at least two organic ligands which differ in their chemical structure and the metallocene compound is free of $C_2$-symmetry and/or any higher symmetry. Preferably the asymetric metallocene compound comprises only two different organic ligands, still more preferably comprises only two organic ligands which are different and linked via a bridge.

Said asymmetric catalyst is preferably a single site catalyst (SSC).

Due to the use of the catalyst system with a very low porosity comprising an asymmetric catalyst the manufacture of the above defined multi-branched polypropylene is possible.

Furthermore it is preferred, that the catalyst system has a surface area of less than 25 $m^2/g$, yet more preferred less than 20 $m^2/g$, still more preferred less than 15 $m^2/g$, yet still less than 10 $m^2/g$ and most preferred less than 5 $m^2/g$. The surface area according to the present technology is measured according to ISO 9277 ($N_2$).

It is in particular preferred that the catalytic system according to the present technology comprises an asymmetric catalyst, i.e. a catalyst as defined below, and has porosity not detectable when applying the method according to DIN 66135 ($N_2$) and has a surface area measured according to ISO 9277 ($N_2$) less than 5 ml/g.

Preferably the asymmetric catalyst compound, i.e. the asymetric metallocene, has the formula (I):

$$(Cp)_2R_zMX_2 \quad \text{(I)}$$

wherein z is 0 or 1,

M is Zr, Hf or Ti, more preferably Zr, and

X is independently a monovalent anionic ligand, such as σ-ligand

R is a bridging group linking the two Cp ligands

Cp is an organic ligand selected from the group consisting of unsubstituted cyclopenadienyl, unsubstituted indenyl, unsubstituted tetrahydroindenyl, unsubstituted fluorenyl, substituted cyclopenadienyl, substituted indenyl, substituted tetrahydroindenyl, and substituted fluorenyl, with the proviso that both Cp-ligands are selected from the above stated group and both Cp-ligands have a different chemical structure.

The term "σ-ligand" is understood in the whole description in a known manner, i.e. a group bonded to the metal at one or more places via a sigma bond. A preferred monovalent anionic ligand is halogen, in particular chlorine (Cl).

Preferably, the asymmetric catalyst is of formula (I) indicated above, wherein

M is Zr and each X is Cl.

Preferably both identical Cp-ligands are substituted.

Preferably both Cp-ligands have different residues to obtain an asymmetric structure.

Preferably, both Cp-ligands are selected from the group consisting of substituted cyclopenadienyl-ring, substituted indenyl-ring, substituted tetrahydroindenyl-ring, and substituted fluorenyl-ring wherein the Cp-ligands differ in the substituents bonded to the rings.

The optional one or more substituent(s) bonded to cyclopenadienyl, indenyl, tetrahydroindenyl, or fluorenyl may be independently selected from a group including halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —$SiR''_3$, —$OSiR''_3$, —SR", —$PR''_2$ and —$NR''_2$, wherein each R" is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl.

More preferably both Cp-ligands are indenyl moieties wherein each indenyl moiety bear one or two substituents as defined above. More preferably each Cp-ligand is an indenyl moiety bearing two substituents as defined above, with the proviso that the substituents are chosen in such a manner that both Cp-ligands are of different chemical structure, i.e both Cp-ligands differ at least in one substituent bonded to the indenyl moiety, in particular differ in the substituent bonded to the five member ring of the indenyl moiety.

Still more preferably both Cp are indenyl moieties wherein the indenyl moieties comprise at least at the five membered ring of the indenyl moiety, more preferably at the 2-position, a substituent selected from the group consisting of alkyl, such as $C_1$-$C_6$ alkyl, e.g. methyl, ethyl, isopropyl, and trialkyloxysiloxy, wherein each alkyl is independently selected from $C_1$-$C_6$ alkyl, such as methyl or ethyl, with proviso that the indenyl moieties of both Cp must chemically differ from each other, i.e. the indenyl moieties of both Cp comprise different substituents.

Still more preferred both Cp are indenyl moieties wherein the indenyl moieties comprise at least at the six membered ring of the indenyl moiety, more preferably at the 4-position, a substituent selected from the group consisting of a $C_6$-$C_{20}$ aromatic ring moiety, such as phenyl or naphthyl, preferably phenyl, which is optionally substituted with one or more substitutents, such as $C_1$-$C_6$ alkyl, and a heteroaromatic ring moiety, with the proviso that the indenyl moieties of both Cp must chemically differ from each other, i.e. the indenyl moieties of both Cp comprise different substituents.

Yet more preferably both Cp are indenyl moieties wherein the indenyl moieties comprise at the five membered ring of the indenyl moiety, more preferably at the 2-position, a substituent and at the six membered ring of the indenyl moiety, more preferably at the 4-position, a further substituent, wherein the substituent of the five membered ring is selected from the group consisting of alkyl, such as $C_1$-$C_6$ alkyl, e.g. methyl, ethyl, isopropyl, and trialkyloxysiloxy, wherein each alkyl is independently selected from $C_1$-$C_6$ alkyl, such as methyl or ethyl, and the further substituent of the six membered ring is selected from the group consisting of a $C_6$-$C_{20}$ aromatic ring moiety, such as phenyl or naphthyl, preferably phenyl, which is optionally substituted with one or more substituents, such as $C_1$-$C_6$ alkyl, and a heteroaromatic ring moiety, with the proviso that the indenyl moieties of both Cp must chemically differ from each other, i.e. the indenyl moieties of both Cp comprise different substituents. It is in particular preferred that both Cp are idenyl rings comprising two substituentes each and differ in the substituents bonded to the five membered ring of the idenyl rings.

Concerning the moiety "R" it is preferred that "R" has the formula (II)

$$—Y(R')_2— \quad (II)$$

wherein

Y is C, Si or Ge, and

R' is $C_1$ to $C_{20}$ alkyl, $C_6$-$C_{12}$ aryl, or $C_7$-$C_{12}$ arylalkyl or trimethylsilyl.

In case both Cp-ligands of the asymmetric catalyst as defined above, in particular case of two indenyl moieties, are linked with a bridge member R, the bridge member R is typically placed at the 1-position. The bridge member R may contain one or more bridge atoms selected from e.g. C, Si and/or Ge, preferably from C and/or Si. One preferable bridge R is —$Si(R')_2$—, wherein R' is selected independently from one or more of e.g. trimethylsilyl, $C_1$-$C_{10}$ alkyl, $C_1$-$C_{20}$ alkyl, such as $C_6$-$C_{12}$ aryl, or $C_7$-$C_{40}$, such as $C_7$-$C_{12}$ arylalkyl, wherein alkyl as such or as part of arylalkyl is preferably $C_1$-$C_6$ alkyl, such as ethyl or methyl, preferably methyl, and aryl is preferably phenyl. The bridge —$Si(R')_2$— is preferably e.g. —$Si(C_1$-$C_6$ alkyl$)_2$-, —$Si(phenyl)_2$- or —$Si(C_1$-$C_6$ alkyl)(phenyl)-, such as —$Si(Me)_2$-.

In a preferred embodiment the asymmetric catalyst, i.e. the asymetric metallocene, is defined by the formula (III)

$$(Cp)_2R_1ZrCl_2 \quad (III)$$

wherein both Cp coordinate to M (e.g., Zr, as shown in formula (III) above) and are selected from the group consisting of unsubstituted cyclopenadienyl, unsubstituted indenyl, unsubstituted tetrahydroindenyl, unsubstituted fluorenyl, substituted cyclopenadienyl, substituted indenyl, substituted tetrahydroindenyl, and substituted fluorenyl, with the proviso that both Cp-ligands are of different chemical structure, and R is a bridging group linking the two ligands Cp, wherein R is defined by the formula (II)

$$—Y(R')_2— \quad (II)$$

wherein

Y is C, Si or Ge, preferably Si, and

R' is $C_1$ to $C_{20}$ alkyl, $C_6$-$C_{12}$ aryl, or $C_7$-$C_{12}$ arylalkyl.

More preferably the asymmetric catalyst is defined by the formula (III), wherein both Cp are selected from the group consisting of substituted cyclopenadienyl, substituted indenyl, substituted tetrahydroindenyl, and substituted fluorenyl.

Yet more preferably the asymmetric catalyst is defined by the formula (III), wherein both Cp are selected from the group consisting of substituted cyclopenadienyl, substituted indenyl, substituted tetrahydroindenyl, and substituted fluorenyl with the proviso that both Cp-ligands differ in the substituents, i.e. the subtituents as defined above, bonded to cyclopenadienyl, indenyl, tetrahydroindenyl, or fluorenyl.

Still more preferably the asymmetric catalyst is defined by the formula (III), wherein both Cp are indenyl and both indenyl differ in one substituent, i.e. in a substituent as defined above bonded to the five member ring of indenyl.

It is in particular preferred that the asymmetric catalyst is a non-silica supported catalyst as defined above, in particular a metallocene catalyst as defined above.

In a preferred embodiment the asymmetric catalyst is dimethylsilyl [(2-methyl-(4'-tert.butyl)-4-phenyl-indenyl)(2-isopropyl-(4'-tert.butyl)-4-phenyl-indenyl)]zirconium dichloride (IUPAC: dimethylsilandiyl [(2-methyl-(4'-tert.butyl)-4-phenyl-indenyl)(2-isopropyl-(4'-tert.butyl)-4-phenyl-indenyl)]zirconium dichloride). More preferred said asymmetric catalyst is not silica supported.

The above described asymmetric catalyst components are prepared according to the methods described in WO 01/48034.

It is in particular preferred that the asymmetric catalyst system is obtained by the emulsion solidification technology as described in WO 03/051934. This document is herewith incorporated in its entirety by reference. Hence the asymmetric catalyst is preferably in the form of solid catalyst particles, obtainable by a process comprising the steps of a) preparing a solution of one or more asymmetric catalyst components;
b) dispersing said solution in a solvent immiscible therewith to form an emulsion in which said one or more catalyst components are present in the droplets of the dispersed phase, and
c) solidifying said dispersed phase to convert said droplets to solid particles and optionally recovering said particles to obtain said catalyst.

Preferably a solvent, more preferably an organic solvent, is used to form said solution. Still more preferably the organic solvent is selected from the group consisting of a linear alkane, cyclic alkane, linear alkene, cyclic alkene, aromatic hydrocarbon and halogen-containing hydrocarbon.

Moreover the immiscible solvent forming the continuous phase is an inert solvent, more preferably the immiscible solvent comprises a fluorinated organic solvent and/or a functionalized derivative thereof, still more preferably the immiscible solvent comprises a semi-, highly- or perfluorinated hydrocarbon and/or a functionalized derivative thereof. It is in particular preferred, that said immiscible solvent comprises a perfluorohydrocarbon or a functionalized derivative thereof, preferably $C_3$-$C_{30}$ perfluoroalkanes, -alkenes or -cycloalkanes, more preferred $C_4$-$C_{10}$ perfluoro-alkanes, -alkenes or -cycloalkanes, particularly preferred perfluorohexane, perfluoroheptane, perfluorooctane or perfluoro (methylcyclohexane) or a mixture thereof.

Furthermore it is preferred that the emulsion comprising said continuous phase and said dispersed phase is a bi- or multiphasic system as known in the art. An emulsifier may be used for forming the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst. The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated $C_1$ to $C_{30}$ alcohol, which reacts e.g. with a cocatalyst component, such as aluminoxane.

In principle any solidification method can be used for forming the solid particles from the dispersed droplets. According to one preferable embodiment the solidification is effected by a temperature change treatment. Hence the emulsion subjected to gradual temperature change of up to 10° C./min, preferably 0.5 to 6° C./min and more preferably 1 to ° C./min. Even more preferred the emulsion is subjected to a temperature change of more than 40° C., preferably more than 50° C. within less than 10 seconds, preferably less than 6 seconds.

The recovered particles have preferably an average size range of 5 to 200 μm, more preferably 10 to 100 μm.

Moreover, the form of solidified particles have preferably a spherical shape, a predetermined particles size distribution and a surface area as mentioned above of preferably less than 25 $m^2/g$, still more preferably less than 20 $m^2/g$, yet more preferably less than 15 $m^2/g$, yet still more preferably less than 10 $m^2/g$ and most preferably less than 5 $m^2/g$, wherein said particles are obtained by the process as described above.

For further details, embodiments and examples of the continuous and dispersed phase system, emulsion formation method, emulsifying agent and solidification methods reference is made e.g. to the above cited international patent application WO 03/051934.

As mentioned above the catalyst system may further comprise an activator as a cocatalyst, as described in WO 03/051934, which is incorporated herein by reference.

Preferred as cocatalysts for metallocenes and non-metallocenes, if desired, are the aluminoxanes, in particular the $C_1$-$C_{10}$-alkylaluminoxanes, most particularly methylaluminoxane (MAO). Such aluminoxanes can be used as the sole cocatalyst or together with other cocatalyst(s). Thus besides or in addition to aluminoxanes, other cation complex forming catalysts activators can be used. Said activators are commercially available or can be prepared according to the prior art literature.

Further aluminoxane cocatalysts are described, for example, in WO 94/28034 which is incorporated herein by reference. These are linear or cyclic oligomers having up to 40, preferably 3 to 20, —(Al(R''')O)— repeat units (wherein R''' is hydrogen, $C_1$-$C_{10}$-alkyl (preferably methyl) or $C_6$-$C_{18}$-aryl or mixtures thereof).

The use and amounts of such activators are within the skills of an expert in the field. As an example, with the boron activators, 5:1 to 1:5, preferably 2:1 to 1:2, such as 1:1, ratio of the transition metal to boron activator may be used. In case of preferred aluminoxanes, such as methylaluminumoxane (MAO), the amount of Al, provided by aluminoxane, can be chosen to provide a molar ratio of Al:transition metal e.g. in the range of 1 to 10,000, suitably 5 to 8000, preferably 10 to 7000, e.g. 100 to 4000, such as 1000 to 3000. Typically in case of a solid (heterogeneous) catalyst the ratio is preferably below 500.

The quantity of cocatalyst to be employed in the catalyst of the present technology is thus variable, and depends on the conditions and the particular transition metal compound chosen in a manner well known to a person skilled in the art.

Any additional components to be contained in the solution comprising the organotransition compound may be added to said solution before or, alternatively, after the dispersing step.

Furthermore, the present technology is related to the use of the above-defined catalyst system for the production of polymers, in particular of a polypropylene according to the present technology.

In addition, the present technology is related to the process for producing the inventive polypropylene, whereby the catalyst system as defined above is employed. Furthermore it is preferred that the process temperature is higher than 60° C. Preferably, the process is a multi-stage process to obtain multimodal polypropylene as defined above.

Multistage processes include also bulk/gas phase reactors known as multizone gas phase reactors for producing multimodal propylene polymer.

A preferred multistage process is a "loop-gas phase"-process, such as developed by Borealis A/S, Denmark (known as BORSTAR® technology) described e.g. in patent literature, such as in EP 0 887 379 or in WO 92/12182.

Multimodal polymers can be produced according to several processes which are described, e.g. in WO 92/12182, EP 0 887 379 and WO 97/22633.

A multimodal polypropylene according to the present technology is produced preferably in a multi-stage process in a multi-stage reaction sequence as described in WO 92/12182. The contents of this document are incorporated herein by reference.

It has previously been known to produce multimodal, in particular bimodal, polypropylene in two or more reactors connected in series, i.e. in different steps (a) and (b).

According to the present technology, the main polymerization stages are preferably carried out as a combination of a bulk polymerization/gas phase polymerization.

The bulk polymerizations are preferably performed in a so-called loop reactor.

In order to produce the multimodal polypropylene according to the present technology, a flexible mode is preferred. For this reason, it is preferred that the composition be produced in two main polymerization stages in combination of loop reactor/gas phase reactor.

Optionally, and preferably, the process may also comprise a prepolymerization step in a manner known in the field and which may precede the polymerization step (a).

If desired, a further elastomeric comonomer component, so called ethylene-propylene rubber (EPR) component as defined in the present technology, may be incorporated into the obtained propylene polymer to form a propylene copolymer as defined above. The ethylene-propylene rubber (EPR) component may preferably be produced after the gas phase polymerization step (b) in a subsequent second or further gas phase polymerizations using one or more gas phase reactors.

The process is preferably a continuous process.

Preferably, in the process for producing the propylene polymer as defined above the conditions for the bulk reactor of step (a) may be as follows:

- the temperature is within the range of 40° C. to 110° C., preferably between 60° C. and 100° C., 70 to 90° C.,
- the pressure is within the range of 20 bar to 80 bar, preferably between 30 bar to 60 bar,
- hydrogen can be added for controlling the molar mass in a manner known per se.

Subsequently, the reaction mixture from the bulk (bulk) reactor (step a) is transferred to the gas phase reactor, i.e. to step (b), whereby the conditions in step (b) are preferably as follows:

- the temperature is within the range of 50° C. to 130° C., preferably between 60° C. and 100° C.,
- the pressure is within the range of 5 bar to 50 bar, preferably between 15 bar to 35 bar,
- hydrogen can be added for controlling the molar mass in a manner known per se.

The residence time can vary in both reactor zones. In one embodiment of the process for producing the propylene polymer the residence time in bulk reactor, e.g. loop is in the range of 0.5 to 5 hours, e.g. 0.5 to 2 hours and the residence time in gas phase reactor will generally be 1 to 8 hours.

If desired, the polymerization may be effected in a known manner under supercritical conditions in the bulk, preferably loop reactor, and/or as a condensed mode in the gas phase reactor.

The process of the present technology or any embodiments thereof above enable highly feasible means for producing and further tailoring the propylene polymer composition within the present technology, e.g. the properties of the polymer composition can be adjusted or controlled in a known manner e.g. with one or more of the following process parameters: temperature, hydrogen feed, comonomer feed, propylene feed e.g. in the gas phase reactor, catalyst, the type and amount of an external donor (if used), split between components.

The above process enables very feasible means for obtaining the reactor-made propylene polymer as defined above.

The cable of the present technology can be prepared by processes known to the skilled person, e.g. by extrusion coating of the conductor. Thereby the polypropylene is preferably extrusion coated, preferably with any other suitable additives like metal deactivator(s), on the conductor.

The present technology will now be described in further detail by the examples provided below.

EXAMPLES

1. Definitions/Measuring Methods

The following definitions of terms and determination methods apply for the above general description of the present technology as well as to the below examples unless otherwise defined.

A. Pentad Concentration

For the meso pentad concentration analysis, also referred herein as pentad concentration analysis, the assignment analysis is undertaken according to T Hayashi, Pentad concentration, R. Chujo and T. Asakura, Polymer 29 138-43 (1988) and Chujo R, et al., Polymer 35 339 (1994)

B. Multi-branching Index

1. Acquiring the Experimental Data

Polymer is melted at T=180° C. and stretched with the SER Universal Testing Platform as described below at deformation rates of dϵ/dt=0.1 0.3 1.0 3.0 and 10 $s^{-1}$ in subsequent experiments. The method to acquire the raw data is described in Sentmanat et al., J. Rheol. 2005, Measuring the Transient Elongational Rheology of Polyethylene Melts Using the SER Universal Testing Platform.

Experimental Setup

A Paar Physica MCR300, equipped with a TC30 temperature control unit and an oven CTT600 (convection and radiation heating) and a SERVP01-025 extensional device with temperature sensor and a software RHEOPLUS/32 v2.66 is used.

Sample Preparation

Stabilized Pellets are compression moulded at 220° C. (gel time 3 min, pressure time 3 min, total moulding time 3+3=6 min) in a mould at a pressure sufficient to avoid bubbles in the specimen, cooled to room temperature. From such prepared plate of 0.7 mm thickness, stripes of a width of 10 mm and a length of 18 mm are cut.

Check of the SER Device

Because of the low forces acting on samples stretched to thin thicknesses, any essential friction of the device would deteriorate the precision of the results and has to be avoided.

In order to make sure that the friction of the device is less than a threshold of 5×10−3 mNm (Milli-Newtonmeter) which is required for precise and correct measurements, the following check procedure is performed prior to each measurement:

- The device is set to test temperature (180° C.) for minimum 20 minutes without sample in presence of the clamps
- A standard test with 0.3 s−1 is performed with the device on test temperature (180° C.)
- The torque (measured in mNm) is recorded and plotted against time The torque must not exceed a value of 5×10−3 mNm to make sure that the friction of the device is in an acceptably low range Conducting the Experiment The device is heated for min. 20 min to the test temperature (180° C. measured with the thermocouple attached to the SER device) with clamps but without sample. Subsequently, the sample (0.7×10×18 mm), prepared as described above, is clamped into the hot device. The sample is allowed to melt for 2 minutes +/−20 seconds before the experiment is started.

During the stretching experiment under inert atmosphere (nitrogen) at constant Hencky strain rate, the torque is recorded as a function of time at isothermal conditions (measured and controlled with the thermocouple attached to the SER device).

After stretching, the device is opened and the stretched film (which is wound on the drums) is inspected. Homogenous extension is required. It can be judged visually from the shape of the stretched film on the drums if the sample stretching has been homogenous or not. The tape must be wound up symmetrically on both drums, but also symmetrically in the upper and lower half of the specimen.

If symmetrical stretching is confirmed hereby, the transient elongational viscosity calculates from the recorded torque as outlined below.

2. Evaluation

For each of the different strain rates d∈/dt applied, the resulting tensile stress growth function $\eta_E^+$ (d∈/dt, t) is plotted against the total Hencky strain ∈ to determine the strain hardening behaviour of the melt, see FIG. 1.

In the range of Hencky strains between 1.0 and 3.0, the tensile stress growth function $\eta_E^+$ can be well fitted with a function $$\eta_E^+(\dot{\in},\in)=c_1\cdot\in^{c_2}$$

where $c_1$ and $c_2$ are fitting variables. Such derived $c_2$ is a measure for the strain hardening behavior of the melt and called Strain Hardening Index SHI.

Dependent on the polymer architecture, SHI can be independent of the strain rate (linear materials, Y- or H-structures)

increase with strain rate (short chain-, hyper- or multi-branched structures).

Figure 2:
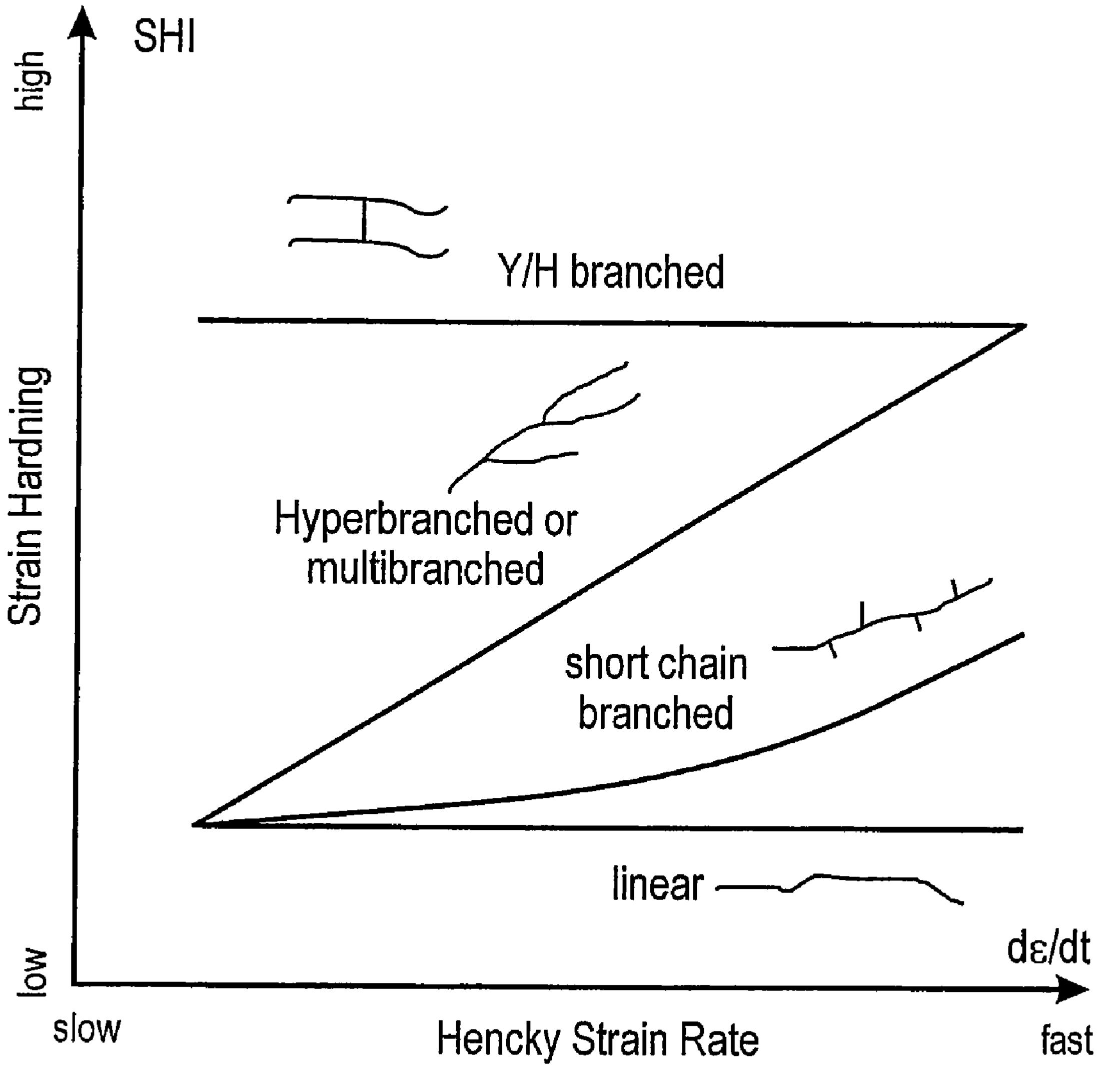
FIG. 2 is a graph depicting the deformation rate versus strain hardening.

This is illustrated in FIG. 2.

For polyethylene, linear (HDPE), short-chain branched (LLDPE) and hyperbranched structures (LDPE) are well known and hence they are used to illustrate the structural analytics based on the results on extensional viscosity. They are compared with a polypropylene with Y and H-structures with regard to their change of the strain-hardening behavior as a function of strain rate, see FIG. 2 and Table 1.

To illustrate the determination of SHI at different strain rates as well as the multi-branching index (MBI) four polymers of known chain architecture are examined with the analytical procedure described above.

The first polymer is a H- and Y-shaped polypropylene homopolymer made according to EP 879 830 ("A") example 1 through adjusting the MFR with the amount of butadiene. It has a MFR230/2.16 of 2.0 g/10 min, a tensile modulus of 1950 MPa and a branching index g' of 0.7.

The second polymer is a commercial hyperbranched LDPE, Borealis "B", made in a high pressure process known in the art. It has a MFR190/2.16 of 4.5 and a density of 923 $kg/m^3$.

The third polymer is a short chain branched LLDPE, Borealis "C", made in a low pressure process known in the art. It has a MFR190/2.16 of 1.2 and a density of 919 $kg/m^3$.

The fourth polymer is a linear HDPE, Borealis "D", made in a low pressure process known in the art. It has a MFR190/2.16 of 4.0 and a density of 954 $kg/m^3$.

The four materials of known chain architecture are investigated by means of measurement of the transient elongational viscosity at 180° C. at strain rates of 0.10, 0.30, 1.0, 3.0 and 10 $s^{-1}$. Obtained data (transient elongational viscosity versus Hencky strain) is fitted with a function $$\eta_E^+c_1*\epsilon^{c2}$$

for each of the mentioned strain rates. The parameters c1 and c2 are found through plotting the logarithm of the transient elongational viscosity against the logarithm of the Hencky strain and performing a linear fit of this data applying the least square method. The parameter c1 calculates from the intercept of the linear fit of the data lg($\eta_E^+$) versus lg(∈) from $$c_1=10^{Intercept}$$

and $c_2$ is the strain hardening index (SHI) at the particular strain rate.

This procedure is done for all five strain rates and hence, SHI@0.1 $s^{-1}$, SHI@0.3 $s^{-1}$, SHI@1.0 $s^{-1}$, SHI@3.0 $s^{-1}$, SHI@10 $s^{-1}$ are determined, see FIG. 1 and Table 1.

TABLE 1

| SHI-values | | | | | | |
|---|---|---|---|---|---|---|
| dϵ/dt | lg (dϵ/dt) | Property | Y and H branched PP A | Hyper-branched LDPE B | short-chain branched LLDPE C | Linear HDPE D |
| 0.1 | −1.0 | SHI@0.1 $s^{-1}$ | 2.05 | — | 0.03 | 0.03 |
| 0.3 | −0.5 | SHI@0.3 $s^{-1}$ | — | 1.36 | 0.08 | 0.03 |
| 1 | 0.0 | SHI@1.0 $s^{-1}$ | 2.19 | 1.65 | 0.12 | 0.11 |
| 3 | 0.5 | SHI@3.0 $s^{-1}$ | — | 1.82 | 0.18 | 0.01 |
| 10 | 1.0 | SHI@10 $s^{-1}$ | 2.14 | 2.06 | — | — |

From the strain hardening behaviour measured by the values of the SHI@1 $s^{-1}$ one can already clearly distinguish between two groups of polymers: Linear and short-chain branched have a SHI@1 $s^{-}$ significantly smaller than 0.30. In contrast, the Y and H-branched as well as hyper-branched materials have a SHI@1 $s^{1}$ significantly larger than 0.30.

In comparing the strain hardening index at those five strain rates $\dot{\in}_H$ of 0.10, 0.30, 1.0, 3.0 and 10 $s^{-1}$, the slope of SHI as function of the logarithm of $\dot{\in}_H$, lg($\dot{\in}_H$) is a characteristic measure for multi-branching. Therefore, a multi-branching index (MBI) is calculated from the slope of a linear fitting curve of SHI versus lg($\dot{\in}_H$):

$$SHI(\dot{\in}_H)=c3+MBI*lg(\dot{\in}_H)$$

The parameters c3 and MBI are found through plotting the SHI against the logarithm of the Hencky strain rate lg($\dot{\in}_H$)

and performing a linear fit of this data applying the least square method. Please confer to FIG. 2.

TABLE 2

| Multi-branched-index (MBI) | | | | |
|---|---|---|---|---|
| Property | Y and H branched PP A | Hyper-branched LDPE B | short-chain branched LLDPE C | Linear HDPE D |
| MBI | 0.04 | 0.45 | 0.10 | 0.01 |

The multi-branching index MBI allows now to distinguish between Y or H-branched polymers which show a MBI smaller than 0.05 and hyper-branched polymers which show a MBI larger than 0.15. Further, it allows to distinguish between short-chain branched polymers with MBI larger than 0.10 and linear materials which have a MBI smaller than 0.10.

Similar results can be observed when comparing different polypropylenes, i.e. polypropylenes with rather high branched structures have higher SHI and MBI-values, respectively, compared to their linear counterparts. Similar to the hyper-branched polyethylenes the new developed polypropylenes show a high degree of branching. However the polypropylenes according to the present technology are clearly distinguished in the SHI and MBI-values when compared to known hyper-branched polyethylenes. Without being bound on this theory, it is believed, that the different SHI and MBI-values are the result of a different branching architecture. For this reason the new found branched polypropylenes according to the present technology are designated as multi-branched.

Combining both, strain hardening index (SHI) and multi-branching index (MBI), the chain architecture can be assessed as indicated in Table 3:

TABLE 3

| Strain Hardening Index (SHI) and Multi-branching Index (MBI) for various chain architectures | | | | |
|---|---|---|---|---|
| Property | Y and H branched | Hyperbranched/ Multi-branched | short-chain branched | linear |
| SHI@1.0 $s^{-1}$ | >0.30 | >0.30 | ≦0.30 | ≦0.30 |
| MBI | ≦0.10 | >0.10 | ≦0.10 | ≦0.10 |

C. Elementary Analysis

The below described elementary analysis is used for determining the content of elementary residues which are mainly originating from the catalyst, especially the Al-, B-, and Si-residues in the polymer. Said Al-, B- and Si-residues can be in any form, e.g. in elementary or ionic form, which can be recovered and detected from polypropylene using the below described ICP-method. The method can also be used for determining the Ti-content of the polymer. It is understood that also other known methods can be used which would result in similar results.

ICP-Spectrometry (Inductively Coupled Plasma Emission)

ICP-instrument: The instrument for determination of Al-, B- and Si-content is ICP Optima 2000 DV, PSN 620785 (supplier Perkin Elmer Instruments, Belgium) with software of the instrument.

Detection limits are 0.10 ppm (Al), 0.10 ppm (B), 0.10 ppm (Si).

The polymer sample was first ashed in a known manner, then dissolved in an appropriate acidic solvent. The dilutions of the standards for the calibration curve are dissolved in the same solvent as the sample and the concentrations chosen so that the concentration of the sample would fall within the standard calibration curve.

ppm: means parts per million by weight

Ash content: Ash content is measured according to ISO 3451-1 (1997) standard.

Calculated ash, Al- Si- and B-content:

The ash and the above listed elements, Al and/or Si and/or B can also be calculated form a polypropylene based on the polymerization activity of the catalyst as exemplified in the examples. These values would give the upper limit of the presence of said residues originating from the catalyst.

Thus the estimate catalyst residue is based on catalyst composition and polymerization productivity, catalyst residues in the polymer can be estimated according to:

$$\text{Total catalyst residues [ppm]}=1/\text{productivity }[kg_{pp}/g_{catalyst}]\times 100$$

$$\text{Al residues [ppm]}=w_{Al,catalyst}[\%]\times \text{total catalyst residues [ppm]}/100$$

$$\text{Zr residues [ppm]}=w_{Zr,catalyst}[\%]\times \text{total catalyst residues [ppm]}/100$$

(Similar calculations apply also for B, Cl and Si residues)

Chlorine residues content: The content of Cl-residues is measured from samples in the known manner using X-ray fluorescence (XRF) spectrometry. The instrument was X-ray fluorescention Philips PW2400, PSN 620487, (Supplier: Philips, Belgium) software X47. Detection limit for Cl is 1 ppm.

D. Further Measuring Methods

Particle size distribution: Particle size distribution is measured via Coulter Counter LS 200 at room temperature with n-heptane as medium.

NMR

NMR-spectroscopy Measurements:

The $^{13}C$-NMR spectra of polypropylenes were recorded on Bruker 400 MHz spectrometer at 130° C. from samples dissolved in 1,2,4-trichlorobenzene/benzene-d6 (90/10 w/w). For the pentad analysis the assignment is done according to the methods described in literature: (T. Hayashi, Y. Inoue, R. Chüjö, and T. Asakura, Polymer 29 138-43 (1988). and Chujo R, et al, Polymer 35 339 (1994).

The NMR-measurement was used for determining the mmmm pentad concentration in a manner well known in the art.

Number average molecular weight ($M_a$), weight average molecular weight ($M_w$) and molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

In detail: The number average molecular weight ($M_n$), the weight average molecular weight ($M_w$) and the molecular weight distribution (MWD) are measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 μL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

Melting temperature Tm, crystallization temperature Tc, and the degree of crystallinity: measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-3. In case more than one melting peak is observed, the melting temperature Tm (as used to interpret the SIST data) is the maximum of the peak at the highest melting temperature with an area under the curve (melting enthalpy) of at least 5% of the total melting enthalpy of the crystalline fraction of the polypropylene.

Foam Density: The foam density is measured according to the Archimedes principle. A specimen of ca. 10 g is cut out of the foam and weighted (m). The foam is then immersed in water and the volume (V) of the displaced water is measured. The density of the foam calculates from $$d=m/V.$$

$MFR_2$: measured according to ISO 1133 (230° C., 2.16 kg load).

Comonomer content is measured with Fourier transform infrared spectroscopy (FTIR) calibrated with $^{13}C$-NMR. When measuring the ethylene content in polypropylene, a thin film of the sample (thickness about 250 mm) was prepared by hot-pressing. The area of $—CH_2—$ absorption peak (800-650 $cm^{-1}$) was measured with Perkin Elmer FTIR 1600 spectrometer. The method was calibrated by ethylene content data measured by $^{13}C$-NMR.

Stiffness Film TD (transversal direction), Stiffness Film MD (machine direction), Elongation at break TD and Elongation at break MD: these are determined according to ISO527-3 (cross head speed: 1 mm/min).

Stiffness (tensile modulus) of the injection molded samples is measured according to ISO 527-2. The modulus is measured at a speed of 1 mm/min.

Haze and transparency: are determined: ASTM D1003-92.

Intrinsic viscosity: is measured according to DIN ISO 1628/1, October 1999 (in Decalin at 135° C.).

Porosity: is measured according to DIN 66135.

Surface area: is measured according to ISO 9277.

Stepwise Isothermal Segregation Technique (SIST): The isothermal crystallisation for SIST analysis was performed in a Mettler TA820 DSC on 3±0.5 mg samples at decreasing temperatures between 200° C. and 105° C.

(i) The samples were melted at 225° C. for 5 min.,
(ii) then cooled with 80° C./min to 145° C.
(iii) held for 2 hours at 145° C.,
(iv) then cooled with 80° C./min to 135° C.
(v) held for 2 hours at 135° C.,
(vi) then cooled with 80° C./min to 125° C.
(vii) held for 2 hours at 125° C.,
(viii) then cooled with 80° C./min to 115° C.
(ix) held for 2 hours at 115° C.,
(x) then cooled with 80° C./min to 105° C.
(xi) held for 2 hours at 105° C.

After the last step the sample was cooled down to ambient temperature, and the melting curve was obtained by heating the cooled sample at a heating rate of 10° C./min up to 200° C. All measurements were performed in a nitrogen atmosphere. The melt enthalpy is recorded as a function of temperature and evaluated through measuring the melt enthalpy of fractions melting within temperature intervals as indicated for example I1 in the table 5 and FIGS. 5, 6 and 7.

The melting curve of the material crystallized this way can be used for calculating the lamella thickness distribution according to Thomson-Gibbs equation (Eq 1.).

$$T_m = T_0\left(1 - \frac{2\sigma}{\Delta H_0 \cdot L}\right)$$

where $T_0$=457K, $\Delta H_0$=184×10$^6$ J/m$^3$, σ=0.0496 J/m$^2$ and L is the lamella thickness.

Dielectric Properties (Dielectric Loss Tangent Value (tan δ)):

1. Preparation of the Plaques:

Neat polymer powders without any additives have been compression moulded at 200° C. in a frame to yield plates of 4 mm thickness, 80 mm width and 80 mm length. The pressure has been adjusted high enough to obtain a smooth surface of the plates. A visual inspection of the plates showed no inclusions such as trapped air or any other visible contamination.

Figure 4:
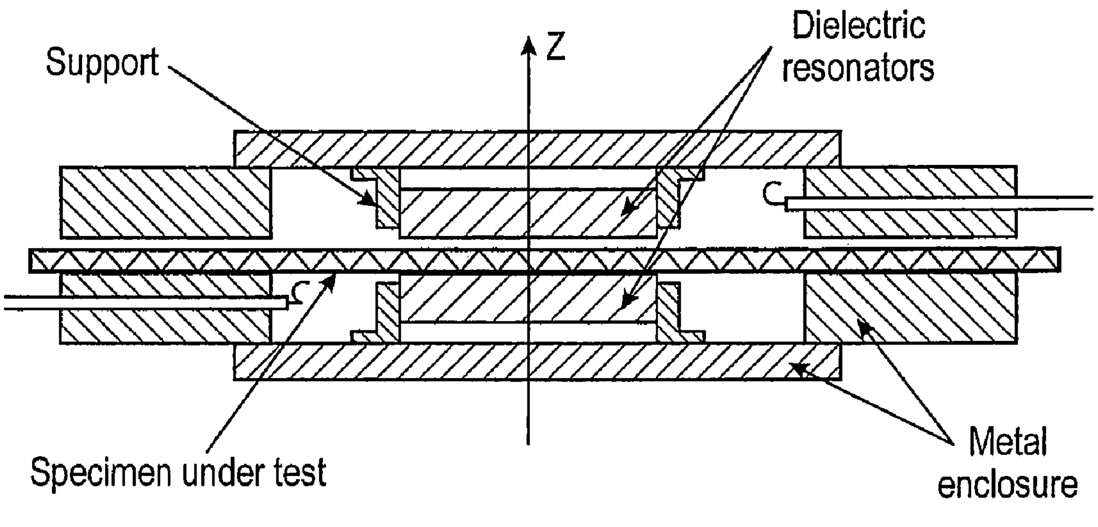
FIG. 4 is a diagram depicting the geometry for measurement of a dielectric constant.

2. Characterization of the Plaques for Dielectric Properties:

For the measurement of the dielectric constant and the tangent delta (tan δ) of the materials, a split-post dielectric resonator has been used. The technique measures the complex permittivity of dielectric laminar specimen (plaques) in the frequency range from 1-10 GHz. Its geometry is shown in FIG. 4.

The test is conducted at 23° C.

The split-post dielectric resonator (SPDR) was developed by Krupka and his collaborators [see: J Krupka, R G Geyer, J Baker-Jarvis and J Ceremuga, 'Measurements of the complex permittivity of microwave circuit board substrates using a split dielectric resonator and re-entrant cavity techniques', Proceedings of the Conference on Dielectric Materials, Measurements and Applications—DMMA '96, Bath, UK, published by the IEE, London, 1996.] and is one of the easiest and most convenient techniques to use for measuring microwave dielectric properties.

Two identical dielectric resonators are placed coaxially along the z-axis so that there is a small laminar gap between them into which the specimen can be placed to be measured. By choosing suitable dielectric materials the resonant frequency and Q-factor of the SPDR can be made to be temperature stable. Once a resonator is fully characterized, only three parameters need to be measured to determine the complex permittivity of the specimen: its thickness and the changes in resonant frequency, Δf, and in the Q-factor, ΔQ, obtained when it is placed in the resonator.

Specimens of 4 mm thickness have been prepared by compression moulding as described above and measured at a high frequency of 1.8 GHz.

A comprehensive review of the method is found in J Krupka, R N Clarke, O C Rochard and A P Gregory, 'Split-Post Dielectric Resonator technique for precise measurements of laminar dielectric specimens—measurement uncertainties', Proceedings of the XIII Int. Conference MIKON'2000, Wroclaw, Poland, pp 305-308, 2000.

Attenuation:

For pair cables the dependence of the attenuation "a" on the dielectric loss factor tan δ is outlined:

The attenuation "a" calculates from constants A and B, from the distance between the wires in a pair 2 s, from the conductor diameter d, from the frequency f, the dielectric constant ∈ and the dielectric loss factor 6 according to:

$$a = A\left(\frac{1}{d\log\left(\frac{2s}{d}\right)}\right)\sqrt{f}\sqrt{\varepsilon} + Bf\tan\delta\sqrt{\varepsilon}$$

A foamed insulation layer has a lower dielectric constant. The density of foam is dependent on the density of the pure, unfoamed, solid material and the achieved degree of expansion. The dielectric constant can be derived from the density of the foam (the more expansion, the lower the foam density, thus the lower the dielectric constant).

The lower the density ρ of the foam, the less the dielectric constant according to $$\in_{Foam} = a \cdot \rho_{Foam} + b$$

with material dependent constants a (>0) and b derived from the dielectric constant of the pure, unfoamed, solid material and the dielectric constant of air.

Inventive materials offer an option to further improve attenuation because, in contrast to linear polypropylenes, they can be foamed. Therefore, the density of the insulation layer can be effectively reduced and thereby, the dielectric constant ∈ can be reduced, yielding lower attenuation α (at high frequencies).

Further information on the concept of attenuation can be found in Standard IEC 61156-7 which specifies a calculation method for the attenuation Eccentricity (ECC) of the Cable Insulation:

Eccentricity (ECC) of the cable insulation is determined from the minimum (Wmin) and the maximum wall thickness (Wmax) of the insulation layer around the core (wire) according to $$ECC = \frac{W_{max} - W_{min}}{2}$$

Figure 8:
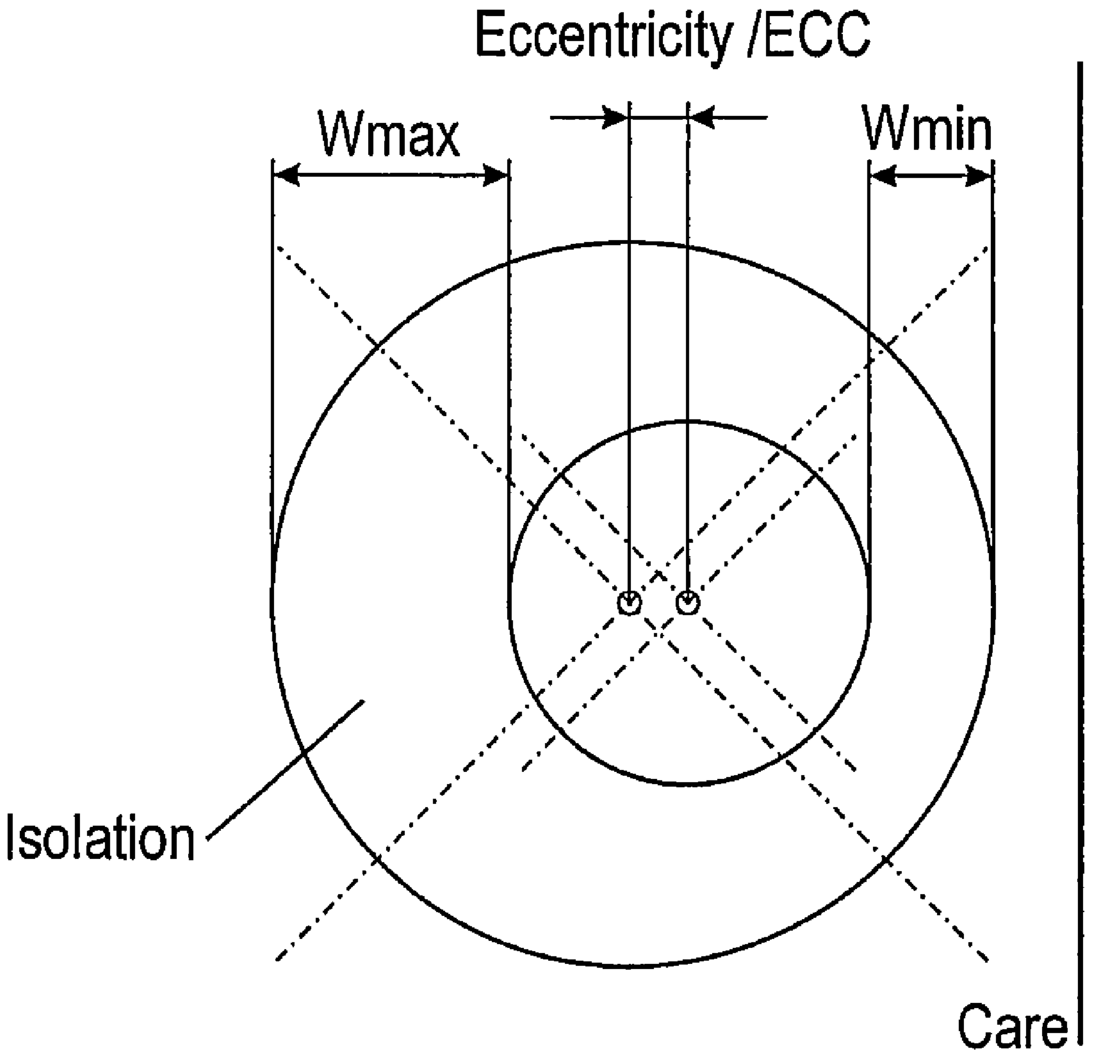
FIG. 8 is a diagram depicting the definition of excentricity (ECC) for cable insulation.

(See also FIG. 8)

Ovality (OVA) of the Cable:

Ovality (OVA) of the cable is determined from the minimum diameter ($d_{min}$) and maximum diameter ($d_{max}$) of the cable insulation according to $$OVA = d_{max} - d_{min}$$

A low eccentricity and ovality are essential for the application because of the strict electrical performance requirements (See also FIG. 8).

3. Examples

Comparative Example 1 (C1)

A polypropylene homopolymer has been prepared using a commercial Z/N catalyst with the Borstar process known in the art to obtain a material described in Table 4, 5 and 6.

Comparative Example 2 (C2)

A Z/N catalyst has been prepared as described in example 1 of WO 03/000754. Such catalyst has been used to polymerize polypropylene copolymer with ethylene of MFR 10. The polymer obtained is described in Table 4, 5 and 6.

Inventive Example 1 (I1)

Catalyst Preparation

The catalyst was prepared as described in example 5 of WO 03/051934, with the Al- and Zr-ratios as given in said example (Al/Zr=250).

Figure 3:
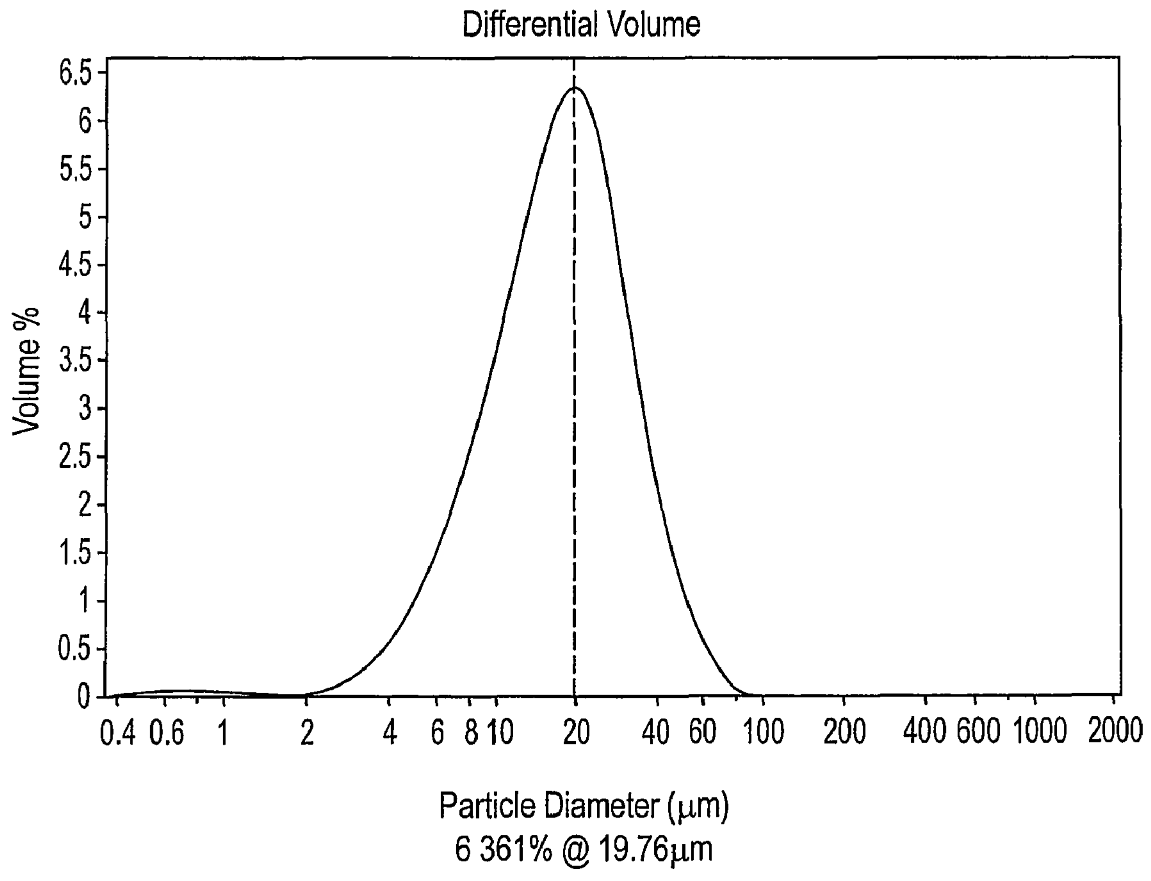
FIG. 3 is a graph depicting the catalyst particle size distribution via a Coulter counter.

Catalyst Characteristics:

Al- and Zr-content were analyzed via above mentioned method to 36.27 wt.-% Al and 0.42%-wt. Zr. The average particle diameter (analyzed via Coulter counter) is 20 μm and particle size distribution is shown in FIG. 3.

Polymerization

A support-free catalyst has been prepared as described in example 5 of WO 03/051934 whilst using the asymmetric metallocene dimethyl-silyl [(2-methyl-(4'-tert.butyl)-4-phenyl-indenyl)(2-isopropyl-(4'-tert.butyl)-4-phenyl-indenyl)] zirconium dichloride.

Such catalyst has been used to polymerize a polypropylene copolymer with ethylene of $MFR_{230/2.16}$ 1.8 g/10 min in the Borstar process, known in the art. The polymer obtained is described in Table 4, 5 and 6.

Preparation of Insulated Wires and Characterization

Insulation extrusion trials were performed on a Francis Shaw extruder (600 mm, 21 L/D), a masterbatch based on the respective polymer was added in order to introduce commercially available additives 0.1% Irganox MD1024 (Ciba) and 0.2% Irganox PS802FL (Ciba) (Results see Table 8)

In Table 4, the properties of the polypropylene materials prepared as described above are summarized.

TABLE 4

Properties of polypropylene materials

| Parameter | Method | Unit | C 1 | C 2 | I 1 |
|---|---|---|---|---|---|
| MFR230/2.16 | MFR | g/10 min | ~4 | ~10 | 1.8 |
| C2 | Wt % | | 0.0 | 1.2 | 4.0 |
| MW | GPC | kg/mol | 450 | 244 | 403 |
| MN | GPC | kg/mol | 88 | 97 | 130 |
| MWD | GPC | None | 5.1 | 2.5 | 3.1 |
| MZ | GPC | kg/mol | 2136 | 519 | 1065 |
| Tm1 | DSC | ° C. | 146.6 | 139.4 | 129.8 |
| Tm2 | DSC | ° C. | 163.3 | 155.9 | 141.9 |
| Hm1 | DSC | J/g | 0.13 | 0.36 | 67.8 |
| Hm2 | DSC | J/g | 111.2 | 105.6 | 31.9 |
| Tc1 | DSC | ° C. | 112.6 | 106.9 | 105.4 |
| Hc1 | DSC | J/g | 102.3 | 98.5 | 83.1 |
| IV | IV | ml/g | 249.22 | 152.71 | 221.72 |
| Tensile Modulus | 527-2 | MPa | 1730.5 | 1199.6 | 1165.6 |
| STRESS AT YIELD | 527-2 | MPa | 37.5 | 31.5 | 31.4 |
| STRAIN AT YIELD | 527-2 | % | 8.5 | 11.9 | 9.5 |
| TENSILE STRENGTH | 527-2 | MPa | 37.5 | 31.5 | 34 |
| STRAIN AT STRENGTH | 527-2 | % | 8.49 | 11.88 | 396.56 |
| STRESS AT BREAK | 527-2 | MPa | 12 | 17 | 33.3 |
| STRAIN AT BREAK | 527-2 | % | 61.26 | 434.73 | 401.28 |

TABLE 5

Figure 5:
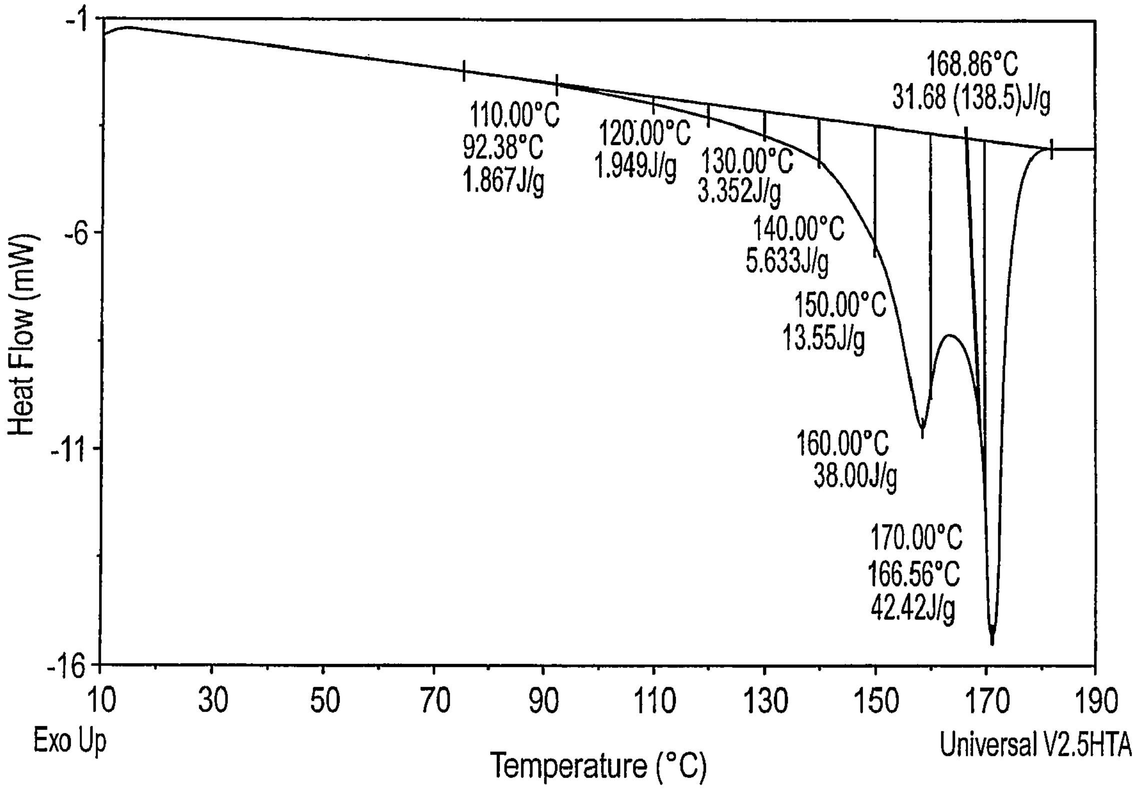
FIG. 5 is a graph depicting the SIST Curve of C1.
Figure 6:
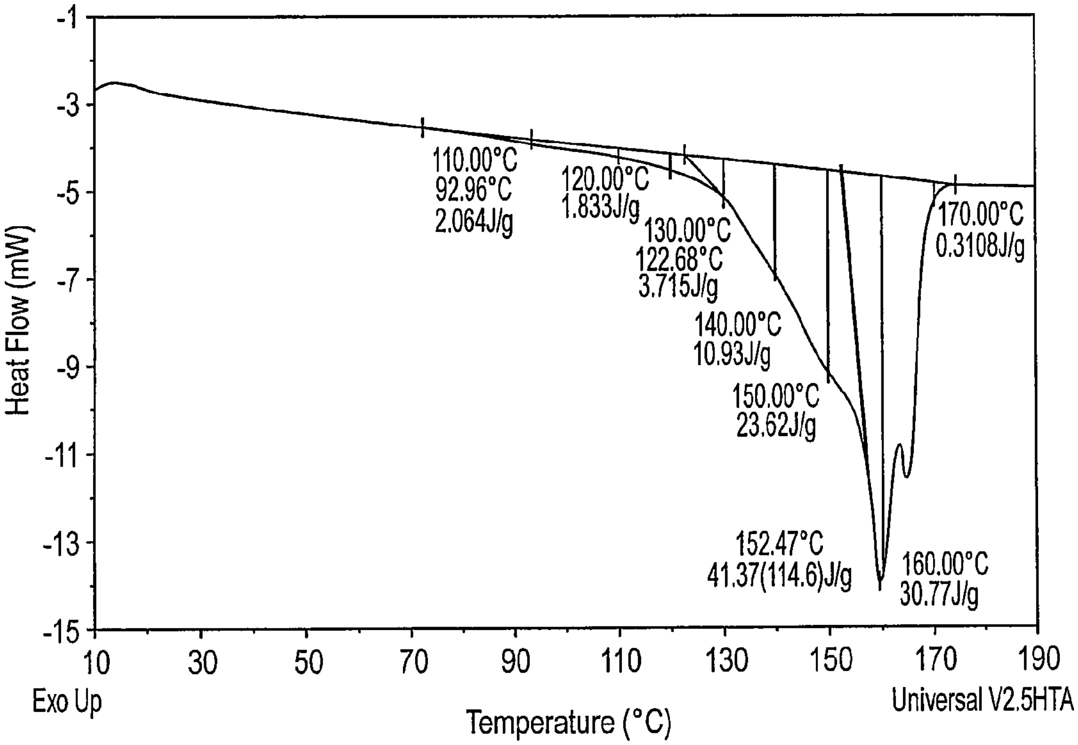
FIG. 6 is a graph depicting the SIST Curve of C2.
Figure 7:
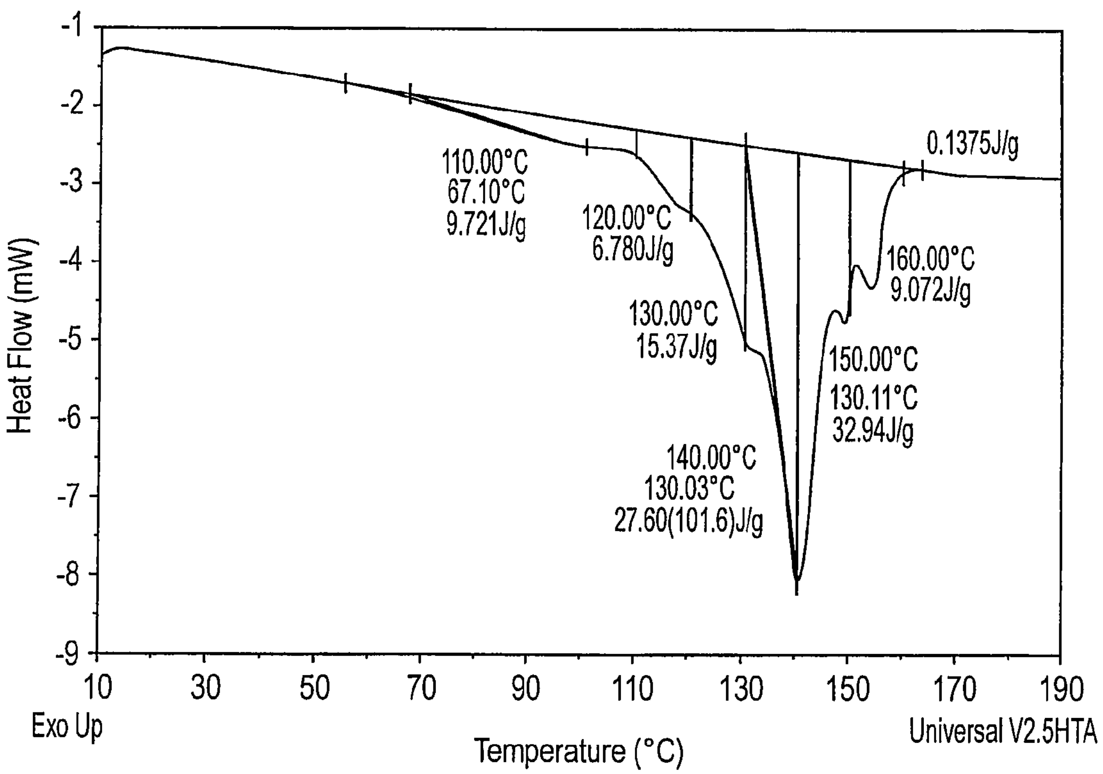
FIG. 7 is a graph depicting the SIST Curve of I1.

Results from stepwise isothermal segregation technique (SIST) (See also the FIGS. 5 to 7)

| Parameter | Method | Unit | C 1 | C 2 | I 1 |
|---|---|---|---|---|---|
| <110 | SIST | J/g | 1.9 | 2.1 | 9.7 |
| 110-120 | SIST | J/g | 1.9 | 1.8 | 6.8 |

TABLE 5-continued

| Results from stepwise isothermal segregation technique (SIST) (See also the FIGS. 5 to 7) | | | | | |
|---|---|---|---|---|---|
| Parameter | Method | Unit | C 1 | C 2 | I 1 |
| 120-130 | SIST | J/g | 3.4 | 3.7 | 15.4 |
| 130-140 | SIST | J/g | 5.6 | 10.9 | 27.6 |
| 140-150 | SIST | J/g | 13.6 | 23.6 | 32.9 |
| 150-160 | SIST | J/g | 38.0 | 41.4 | 9.07 |
| 160-170 | SIST | J/g | 42.4 | 30.8 | 0.14 |
| >170 | SIST | J/g | 31.7 | 0.3 | 0.00 |

TABLE 6

| Rheological Parameters and Polymer chain architecture | | | | | |
|---|---|---|---|---|---|
| Parameter | Method | Unit | C 1 | C 2 | I 1 |
| g' | IV | — | 1 | 1 | 0.8 |
| SHI@0.1 $s^{-1}$ | SER | — | — | — | 0.58 |
| SHI@0.3 $s^{-1}$ | SER | — | — | — | 0.74 |
| SHI@1.0 $s^{-1}$ | SER | — | — | — | 0.80 |
| SHI@3.0 $s^{-1}$ | SER | — | — | — | 0.75 |
| SHI@10 $s^{-1}$ | SER | — | — | — | n/a |
| MBI | SER | — | — | — | 0.12 |
| Structure | | — | Linear | Linear | Multi-branched |

TABLE 7

| Dielectric properties of the polymers (Influencing Factors for the Attenuation "a") | | | | | |
|---|---|---|---|---|---|
| Code | Unit | C1 1 | C2 2 | I1 3 | Method |
| Tan delta* | $\times 10^{-6}$ | 102 | 147 | 58-66 | NPL measurement |
| Dielectric constant | — | 2.25 | 2.26 | 2.25 | NPL measurement |

As can be seen from the Table 7, the inventive material (I1) shows (unfoamed, rigid) a very low tan δ, much lower than the purest (hence best) Ziegler-Natta polypropylenes known commercially and from literature. Such behaviour is favourable because it enables the manufacturing of cables with low power loss in the electrical signal.

TABLE 8

| Conversion properties to Cables | |
|---|---|
| Francis Shaw Tooling | Pressure |
| Die diameter | 1.00 mm long |
| Wire guide diameter | 0.55 mm |
| Screw type | Barrier screw |
| Breaker plate | Yes |
| Filter | No |
| Core | 0.53 mm Cu solid |

| | C 1 | C 2 | I 1 |
|---|---|---|---|
| Temperature profile ° C.) | 182 | 181 | 180 |
| | 195 | 195 | 195 |
| | 219 | 219 | 219 |
| | 221 | 220 | 220 |
| | 220 | 220 | 221 |
| | 220 | 220 | 221 |
| | 223 | 223 | 223 |
| | 220 | 220 | 221 |
| Pressure (bar) | 191 | 204 | 209 |
| Line speed (m/min) | 1000 | 975 | 965 |
| Screw speed (rpm) | 75 | 76 | 35 |

TABLE 8-continued

| Conversion properties to Cables | | | |
|---|---|---|---|
| Extruder Amps (A) | 27 | 27 | 26 |
| Capstan Amps (A) | 4 | 5 | 5 |
| Cable Diameter (mm) | 0.930 ± 0.003 | 0.932 ± 0.003 | 0.927 ± 0.001 |
| ECC (mm) | 0.006 ± 0.001 | 0.005 ± 0.001 | 0.009 ± 0.0006 |
| OVA (mm) | 0.009 ± 0.004 | 0.013 ± 0.002 | 0.008 ± 0.004 |
| Surface appearance | Very nice smooth surface | Very nice smooth surface | Very nice smooth surface |

The present technology has now been described in such full, clear, concise and exact terms as to enable a person familiar in the art to which it pertains, to practice the same. It is to be understood that the foregoing describes preferred embodiments and examples of the present technology and that modifications may be made therein without departing from the spirit or scope of the present technology as set forth in the claims. Moreover, while particular elements, embodiments and applications of the present technology have been shown and described, it will be understood, of course, that the present technology is not limited thereto since modifications can be made by those familiar in the art without departing from the scope of the present disclosure, particularly in light of the foregoing teachings and appended claims. Moreover, it is also understood that the embodiments shown in the drawings, if any, and as described above are merely for illustrative purposes and not intended to limit the scope of the present technology, which is defined by the following claims as interpreted according to the principles of patent law, including the Doctrine of Equivalents. Further, all references cited herein are incorporated in their entirety.

The invention claimed is:

1. A cable comprising a conductor and a cable layer, said cable layer comprising a polypropylene material, at least one of the cable layer and the polypropylene material comprising:

a crystalline fraction crystallizing in the temperature range of 200 to 105° C. determined by stepwise isothermal segregation technique, said crystalline fraction comprising a part;

wherein, during subsequent melting at a melting rate of 10° C./min, said part melts at or below 130° C. and said part represents at least 20 percent by weight of said crystalline fraction, and further wherein said polypropylene material has been produced in the presence of a catalyst system comprising an asymmetric, non-silica supported solid metallocene catalyst, wherein the catalyst system has a porosity of less than 1.40 ml/g.

2. The cable of claim 1, wherein at least one of said cable layer and said polypropylene material have at least one of the following properties:

a) a branching index g' of less than 1.00; and b) a strain hardening index of at least 0.30 measured by a deformation rate of 1.00 $s^{-1}$ at a temperature of 180° C.;

wherein the strain hardening index is defined as a slope of a logarithm to the basis 10 of the tensile stress growth function as a function of a logarithm to the basis 10 of the Hencky strain in the range of Hencky strains between 1 and 3.

3. The cable of claim 1, wherein at least one of said cable layer and said polypropylene material have a multi-branching index of greater than 0.10, wherein the multi-branching index is defined as a slope of a strain hardening index as a function of the logarithm to the basis 10 of a Hencky strain rate, defined as (log(d∈/dt)), wherein:

a) d∈/dt is the deformation rate, b) ∈ is the Hencky strain, and c) the strain hardening index is measured at a temperature of 180° C., wherein the strain hardening index is defined as a slope of a logarithm to the basis 10 of the tensile stress growth function as a function of a logarithm to the basis 10 of the Hencky strain in the range of Hencky strains between 1 and 3.

4. The cable of claim 1, wherein said crystalline fraction represents at least 90 percent by weight of at least one of said cable layer and said polypropylene material.

5. The cable of claim 1, wherein at least one of said cable layer and said polypropylene material has an aluminium residue content of less than 25 ppm, a boron residue content less than 25 ppm, or a silicon residue content of less than 25 ppm.

6. The cable of claim 1, wherein at least one of said cable layer and said polypropylene material is expanded.

7. The cable of claim 1, wherein at least one of said cable layer and said polypropylene material is expanded by foaming.

8. The cable of claim 1, wherein said cable layer has a tensile modulus of at least 900 Mpa measured according to ISO 527-3 at a cross head speed of 1 mm/min.

9. The cable of claim 1, wherein at least one of said cable layer and said polypropylene material has a melting point Tm of at least 125° C.

10. The cable of claim 1, wherein said polypropylene material is multimodal.

11. The cable of claim 1, wherein said polypropylene material is unimodal.

12. The cable of claim 1, wherein said polypropylene material has a molecular weight distribution of not more than 8.00, measured according to ISO 16014.

13. The cable of claim 1, wherein said polypropylene material has a melt flow rate of up to 30 g/10 min, measured according to ISO 1133.

14. The cable of claim 1, wherein said polypropylene material has an mmmm pentad concentration of higher than 90 percent by weight.

15. The cable of claim 1, wherein said polypropylene material has a meso pentad concentration of higher than 90 percent by weight determined by NMR-spectroscopy.

16. The cable of claim 1, wherein said polypropylene material is a propylene homopolymer.

17. The cable of claim 1, wherein said polypropylene material is a propylene copolymer.

18. The cable of claim 17, wherein the propylene copolymer has an ethylene comonomer.

19. The cable of claim 17, wherein the propylene copolymer has a total amount of comonomer of up to 10 mol %.

20. The cable of claim 17, wherein the propylene copolymer comprises a polypropylene matrix and an ethylene-propylene rubber.

21. The cable of claim 20, wherein the ethylene-propylene rubber in the propylene copolymer is in an amount of up to 70 percent by weight.

22. The cable of claim 20, wherein the ethylene-propylene rubber has an ethylene content of up to 50 percent by weight.

23. The cable of claim 1, wherein the cable has a dielectric loss tangent value of less than $100 \times 10^{-6}$ determined by a frequency of 1.8 GHz.

24. The cable of claim 1, wherein said cable layer further comprises at least one metal deactivator.

25. The cable of claim 1, wherein the asymmetric catalyst is dimethylsilyl [(2-methyl-(4'-tert.butyl)-4-phenyl-indenyl) (2-isopropyl-(4'-tert.butyl)-4-phenyl-indenyl)]zirconium dichloride.

26. The cable of claim 1, further wherein the polypropylene material has a melt flow rate in the range of approximately 1.00 to 11.00 g/10 min, wherein the melt flow rate is measured under a load of 2.16 kg at 230° C.

27. The cable of claim 26, wherein the melt flow rate of the polypropylene material is in the range of approximately 1.00 to 4.00 g/10 min.

28. The cable of claim 27, further wherein the polypropylene material has a melt flow rate of approximately 1.8 g/10 min.

29. A cable comprising a conductor and a cable layer, said cable layer comprising a polypropylene material, at least one of the cable layer and the polypropylene material comprising:

a) a branching index g' of less than 1.00; and b) a strain hardening index of at least 0.30 measured by a deformation rate of $1.00\ s^{-1}$ at a temperature of 180° C., wherein the strain hardening index is defined as a slope of a logarithm to the basis 10 of a tensile stress growth function as a function of a logarithm to the basis 10 of a Hencky strain in the range of Hencky strains between 1 and 3, further wherein the polypropylene material is produced in the presence of a catalyst system comprising an asymmetric, non-silica supported solid metallocene catalyst, wherein the catalyst system has a porosity of less than 1.40 ml/g.

30. The cable of claim 29, wherein at least one of said cable layer and said polypropylene material has a multi-branching index of greater than 0.10, wherein the multi-branching index is defined as a slope of the strain hardening index as a function of a logarithm to the basis 10 of the Hencky strain rate.

31. The cable of claim 29, wherein the asymmetric catalyst is dimethylsilyl [(2-methyl-(4'-tert. butyl)-4-phenyl-indenyl) (2-isopropyl-(4'-tert.butyl)-4-phenyl-indenyl)]zirconium dichloride.

32. The cable of claim 29, further wherein the polypropylene material has a melt flow rate of approximately 1.8 g/10 min, wherein the melt flow rate is measured under a load of 2.16 kg at 230° C.

33. A cable comprising a conductor and a cable layer, said cable layer comprising a polypropylene material, wherein at least one of the cable layer and the polypropylene material have a multi-branching index of greater than 0.10, wherein the multi-branching index is defined as a slope of strain hardening index as a function of the logarithm to the basis 10 of a Hencky strain rate, defined as (log(d∈/dt)), wherein:

a) d∈/dt is the deformation rate, b) ∈ is the Hencky strain, and c) the strain hardening index is measured at a temperature of 180° C., wherein the strain hardening index is defined as a slope of a logarithm to the basis 10 of the tensile stress growth function as a function of a logarithm to the basis 10 of the Hencky strain in the range of Hencky strains between 1 and 3, further wherein the polypropylene material is produced in the presence of a catalyst system comprising an asymmetric, non-silica supported solid metallocene catalyst, wherein the catalyst system has a porosity of less than 1.40 ml/g.

34. The cable of claim 33, wherein at least one of the cable layer and the polypropylene material have:

a) a branching index g' of less than 1.00; and b) a strain hardening index of at least 0.30 measured by a deformation rate of 1.00 $s^{-1}$ at a temperature of 180° C., wherein the strain hardening index is defined as a slope of a logarithm to the basis 10 of a tensile stress growth function as a function of a logarithm to the basis 10 of a Hencky strain in the range of Hencky strains between 1 and 3.

35. The cable of claim 33, wherein the asymmetric catalyst is dimethylsilyl [(2-methyl-(4'-tert.butyl)-4-phenyl-indenyl) (2-isopropyl-(4'-tert.butyl)-4-phenyl-indenyl)]zirconium dichloride.

36. The cable of claim 33, further wherein the polypropylene material has a melt flow rate of approximately 1.8 g/10 min, wherein the melt flow rate is measured under a load of 2.16 kg at 230° C.

* * * * *